United States Patent [19]

Daniell et al.

[11] Patent Number: 4,620,276
[45] Date of Patent: Oct. 28, 1986

[54] METHOD AND APPARATUS FOR ASYNCHRONOUS PROCESSING OF DYNAMIC REPLICATION MESSAGES

[75] Inventors: Thomas P. Daniell, Palo Alto; Robert C. Harding, Jr., Cupertino; Roger W. R. Harvey, Santa Cruz; Sven H. H. Nauckhoff, San Jose, all of Calif.

[73] Assignee: International Business Machines Corporation, Armonk, N.Y.

[21] Appl. No.: 500,582

[22] Filed: Jun. 2, 1983

[51] Int. Cl.⁴ .............................................. G06F 9/00
[52] U.S. Cl. .................................................. 364/200
[58] Field of Search ... 364/200 MS File, 900 MS File, 364/300

[56] References Cited

U.S. PATENT DOCUMENTS 4,432,057 2/1984 Daniell et al. ...................... 364/300
4,539,655 9/1985 Trussell et al. ...................... 364/900

Primary Examiner—Raulfe B. Zache
Attorney, Agent, or Firm—Shelly M. Beckstrand; R. Bruce Brodie

[57] ABSTRACT

Messages at nodes of a distributed data system are processed asynchronously. Each data atom shared by a pair of nodes is characterized by dipole halves maintained at each node including an access control characteristic, a quality control characteristic, and a pair of rank values. A rank value is a value which monotonically increases (with respect to time) with each significant event. A message from a paired node requesting a change to a dipole half at this node includes the set of rank values at the paired node for the shared data atom. This node compares the rank values which it maintains with those received from the paired node and, based upon the result, selectively rejects or processes the request.

17 Claims, 26 Drawing Figures

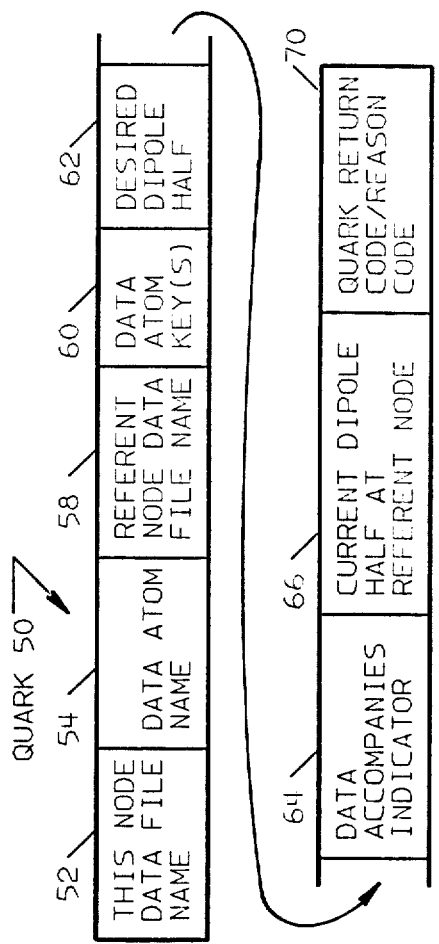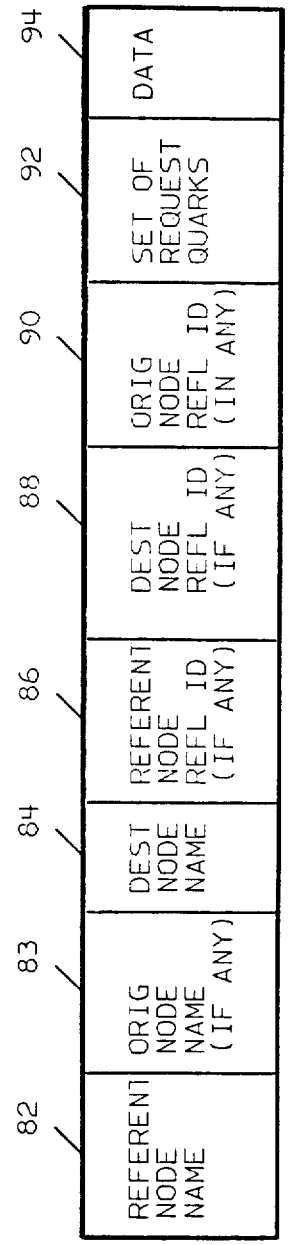

ACCESS CONTROL - SIGNIFICANT EVENTS

QUALITY CONTROL - SIGNIFICANT EVENTS

METHOD AND APPARATUS FOR ASYNCHRONOUS PROCESSING OF DYNAMIC REPLICATION MESSAGES

BACKGROUND OF THE INVENTION

1. Field of the Invention

This invention relates to new and useful improvements in methods of operating general purpose digital computing systems. More specifically, it relates to an apparatus and method for utilizing data storage and communication resources in a multiprocessing distributed data base system by dynamically replicating data under distributed system control.

2. Description of the Prior Art

This invention is an improvement on the method described in U.S. patent application Ser. No. 06/325,531, filed Nov. 27, 1981 by T. P. Daniell, et al, for a Method for the Dynamic Replication of Data Under Distributed System Control to Control Utilization of Resources in a Multiprocessing, Distributed Data Base System, the teachings of which are incorporated herein by reference. As is further described in Daniell, et al, a multiprocessing general purpose computing system typically includes a plurality of nodes interconnected by a communication network and having a data store. The replication of data at various nodes is controlled through the use of dipole halves, with a dipole half stored in each node of a node pair specifying the status of a shared data atom at the related node assumed by this node.

The improvement in this application relates, generally, to an "asynchronous" communication protocol for such a dynamic replication system. In the system of Daniell, et al, the implicit assumption is that each node of a node pair may change its dipole half at the same time. This requires that either a two-phase commit, handshaking, or buffering procedure be implemented by some other facility to assure synchronous operation. A two-phase commit procedure assures that if a failure occurs when only one node of a node pair has changed its dipole half, that node will be required to back out the change to restore consistency between the two dipole halves. Alternatively, a communication protocol which enforces some orderly communication of messages, or a buffer protocol which buffers messages until some required order is obtained, may be provided.

By this invention, the communication of messages between nodes may be asynchronous; that is, unorderly. Thus, messages may get lost between nodes, messages which have been received and processed may unexpectedly reappear, messages may arrive out of order, and conflicting messages may pass each other in the communication channels interconnecting the nodes (like "ships that pass in the night"). By this invention, messages received at each node will be processed normally, or else discarded, in the order of their receipt at a node, and no two-phase commit or other procedure need be implemented to assure consistency between the dipole halves of paired nodes.

SUMMARY OF THE INVENTION

This invention provides a method and apparatus for asynchronous processing dynamic replication messages between nodes in a multiprocessor system.

This invention further provides a method for operating a computing node, designated as this node, in a multiprocessing distributed data base system which includes this node and a paired node. The method comprises the steps of:

generating at this node a first rank value TNRANK which increases monotonically with each significant event at this node, and is communicated to said paired node in a first message;

storing at this node a second rank value PNRANK which is received in a second message from paired node; and responsive to a third message received from said paired node which includes a third rank value QPNRANK representing the then current rank value at said paired node and a fourth rank value QTNRANK representing the rank value then stored at said paired node for this node, determining the relationship between said first TNRANK and fourth QTNRANK rank values and said second PNRANK and third QPNRANK rank values;

responsive to said relationships, selectively processing or ignoring a dynamic replication request contained in the message.

The invention further provides a computing apparatus which is this node in a multiprocessor system including this node and a paired node. The apparatus includes:

means for generating and storing a first rank value (TNRANK) which increases monotonically with each significant event at this node;

means for communicating the current rank value at this node to said paired node;

means for receiving from said paired node a second rank value (PNRANK) representing the then current rank value at said paired node;

means, responsive to a request message from said paired node including a third rank value (QPNRANK) representing the then current rank value at said paired node and a fourth rank value (QTNRANK) representing the rank value at said paired node for this node, for determining the relationships between said first and fourth, and said second and third, rank values; and means responsive to said relationships for selectively processing said request message.

BRIEF DESCRIPTION OF THE DRAWINGS

FIG. 2 is an illustration of the format of a quark.

FIG. 3 is an illustration of a dynamic replication message.

DESCRIPTION OF THE PREFERRED EMBODIMENT

This invention relates to the apparatus provided at each of a plurality of nodes in a multiprocessor computing system and to the methods implemented at each such node for managing the distribution of data through data replication.

In accordance with the invention, dynamic replication requests are processed in much the same manner whether they originate locally from an application program, operator facility, or utility at a node, or they emanate from a process at another node. These requests, referred to as dynamic replication messages, express the data access requirements of the requestor.

A data atom is the unit of control for a given data base organization. A data base may contain data atoms of more than one data atom type. The data atom type is identified by a data atom name. In this embodiment of the invention, it is the responsibility of a data base manager to correctly express the consistency requirements and effects, referred to as the semantics, of a data access request in terms of dynamic replication quarks. A quark, as will be further described hereafter, represents a desired change to a dipole half.

Processing of a quark at a node is governed by the data state. The data state is represented by control information in the format of dipoles halves. Conceptually, there exists a dipole for every combination of data atom and node pair in the network, or system. A dipole describes the relationship between the nodes in the pair with respect to the data atom. Each of the two nodes holds one half of the dipole, which is referred to as a dipole half. A dipole half describes one node's view of the status of the data atom as represented by the other node of the pair. Thus, each node has an exocentric view of the status of data in the network.

Hereafter, a default dipole half will be defined. A given node is said to be unrelated to another node when the given node holds the default dipole half for the other node. Correspondingly, a given node is said to be related to another node if the given node holds any other dipole half for the other node.

A dipole half that is held by a first node, and that describes the first node's view of a second node, defines the state of the first node's window to the second node, and constitutes a window of the first node, namely the second node window of the first node. The recursive criteria for determining the nodes that are described by a given window is as follows: node W is in node X's window to node Y if and only if (rule 1) node W is node Y and node X is related to node Y, or (rule 2) node W is in any window, other than the node X window, of a node which is in node X's window to node Y.

Figure 1:
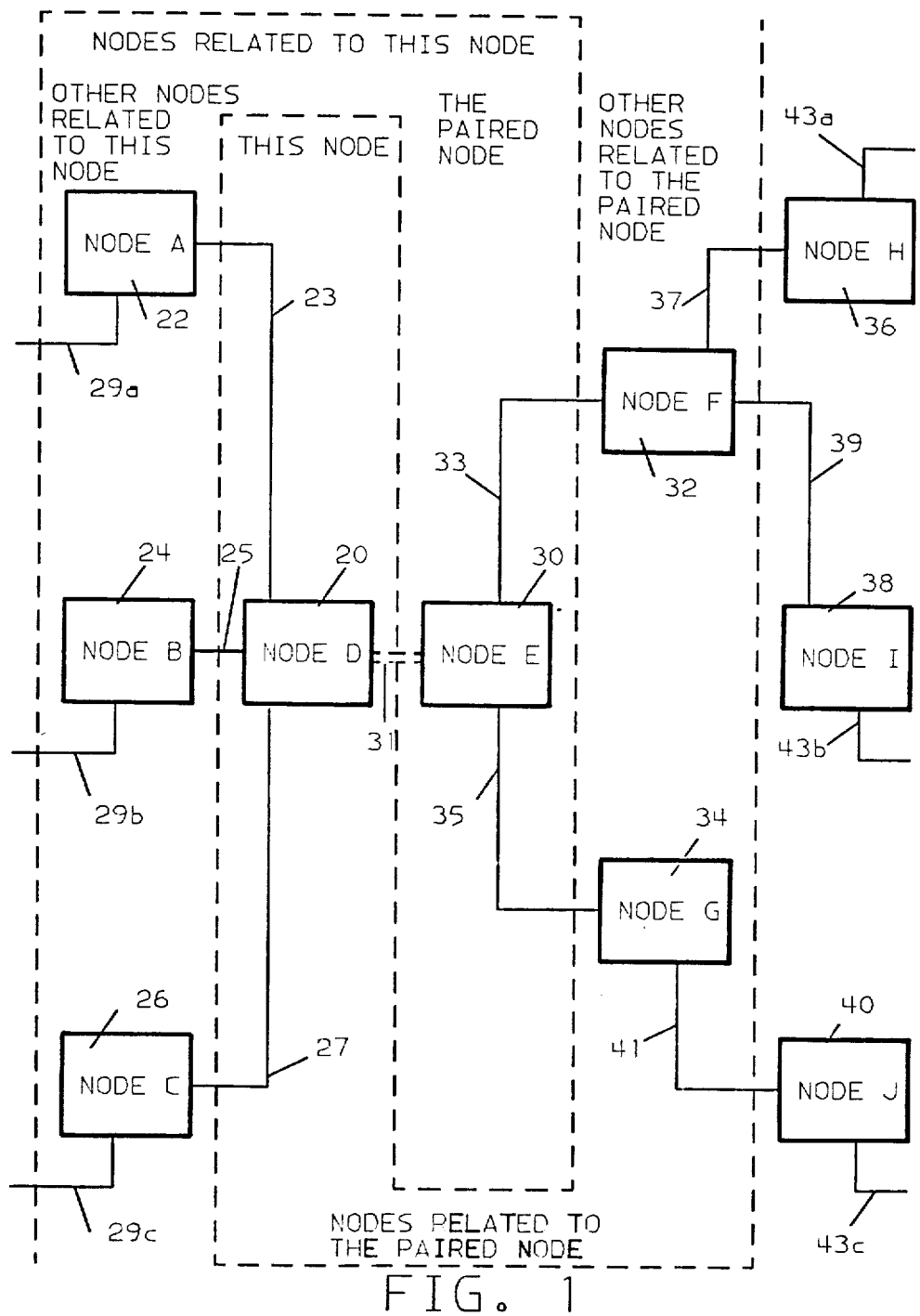
FIG. 1 is a diagrammatic illustration of nodes in a system.

Referring now to FIG. 1, ten nodes are illustrated as being related for a given data atom. FIG. 1 illustrates a plurality of sets of nodes in an exocentric view. As is represented by lines 23, 25, and 27, nodes 22, 24, and 26, respectively, all hold one dipole half describing the relationship between the respective node and node 20. The nodes may also hold dipole halves for other nodes, not shown in FIG. 1, as is indicated by lines 29a–c.

Node 20 holds four dipole halves: the other half of the dipole with each of nodes 22, 24, and 26, as is represented by lines 23, 25, and 27; and a dipole half represented by line 31 that describes its view of node 30.

Node 30 holds three dipole halves: the other half of the dipole 31 with node 20, and dipole halves 33 and 35, one for each of nodes 32 and 34, respectively. Each of nodes 32 and 34 holds a dipole half 33, 35, respectively, completing the dipole with node 30. Node 32 holds a dipole half 37 for node 36, and dipole half 39 for node 38. Node 34 holds a dipole half 41 for node 40. Nodes 36, 38, and 40 each hold a dipole half 37, 39, 41, respectively, to complete the dipole with nodes 32 and 34, respectively. They may also hold dipole halves 43a–c for nodes not shown in FIG. 1.

Each of the dipole halves, illustrated by lines 23, 25, 27, . . . . 39, 41, 43, describes the current state of the relationship, with respect to the given data atom, between the nodes in a pair of nodes, from the view of the node that holds the dipole.

Referring further to FIG. 1, the following sets of nodes are defined, given that the dipole half 31 that is held by node 20 describes its relationship with node 30:

1. This node (TN): node 20 is referred to as this node, or TN, since it is the node that holds the given dipole half 31 and thereby constitutes the reference point for the exocentric view.

2. The paired node (PN): node 30 is referred to as the paired node, or PN, since it is the node that holds the other dipole half 31 for the given node pair 20, 30.

3. Other node(s) related to this node (OTN): nodes 22, 24, and 26 constitute the set of other nodes related to this node, or OTN, and includes all nodes, with the exception of the paired node 30, for which this node 20 holds a dipole half 23, 25, 27 that is different from the default dipole half.

4. Nodes related to this node (RTN): nodes 22, 24, 26, and 30 are nodes related to this node 20, or RTN, and includes all nodes for which this node 20 holds a dipole half 23, 25, 27, 31 different from the default dipole half.

5. Nodes 32 and 34 are other nodes related to the paired node 30, and include all nodes, with the exception of this node 20, for which the paired node 30 holds a dipole half 33, 35 that is different from the default dipole half.

6. Nodes 20, 32, and 34 are nodes related to the paired node 30, and include all nodes for which the paired node 30 holds a dipole half 31, 33, 35 different from the default dipole half.

As an example of the window construct, node 36 is in node 20's window to node 30. This result is constructed as follows: (1) by rule 1, supra, node 30 is in node 20's window to node 30; (2) by rule 1 for node 32, node 32 is in any window of node 30, other (by rule 2) than node 30's window to node 20; and (3) by rule 1 for node 36, node 36 is in any window of node 32, other (by rule 2) than node 32's window to node 30. Consequently, node 36 is in (node 32's window to node 36 that is in node 30's window to node 32 that is in) node 20's window to node 30.

As a further example of the window construct, node 22 is not in node 20's window to node 30: (1) by rule 1, node 30 is in node 20's window to node 30, but (2) node 22 is in node 30's window to node 20, which violates rule 2 of the window definition, supra.

Referring to FIG. 2, and by way of further refinement of the description provided in Daniell, et al, supra, dynamic replication requests are formulated and processed in terms of quarks 50, which include, among other things, desired dipole halves. For a given data atom, an origination node submits to a destination node a specification of what it wants the dipole half held at the destination node for a referent node to be, i.e., what view it wants the destination node to have of the status of data at the referent node after the request has been processed. When quark 50 is received by the destination node, the quark is processed in terms of the destination node being this node 20, the referent node being the paired node 30, and the origination node being any node in the network Application programs and utility programs, are considered to be nodes for these purposes. In most instances of a quark, and hereafter unless otherwise specified, the origination node and the referent nodes are one and the same (i.e., node 30).

The quark processing may result in this node 20 sending a response in form of a dynamic replication request to the paired node 30. The response takes the same form as the original request: this node 20 submits a specification of what it wants the paired node 30's dipole half 31 for this node 20 to be. Also, an acknowledgement may be generated by this node 20 and sent to the origination node.

Depending on the context in which it occurs, a quark can perform three functions. There is nothing in a quark which identifies the function of a quark, the function being solely determined by the context in which it is being processed, as follows:

1. Request quark: an origination node may request this node 20 to change the dipole half for a referent node 30. Such a quark, referred to as a request quark, serves as the input 50 to the quark processing procedure to be described hereafter in connection with FIG. 4.

2. Conflict quark: the granting of a request quark may pose a conflict with one or more dipole halves 23, 25, 27, held at this node 20 for the same data atom. If so, conflict quarks are generated from this node 20 to the other node(s) 22, 24, 26 with which there is a conflict. A conflict quark specifies the dipole half change required at the other node 22, 24, 26 before the request quark can be successfully processed. When the conflict quark generated by this node 20 arrives at the other node 22, 24, 26 for processing, it functions as a request quark at the other node.

3. Response quark: after conflict processing is complete, the processing of the original request quark can be resumed. The processing results in a change to the dipole half at this node 20 for the referent node 30 for the data atom as well as the generation of response quarks. A response quark specifies changes desired to the referent node 30's dipole half 31 for this node 20 to reflect the processing of the original request. When a response quark generated by this node 20 arrives at the referent node 30 for processing, it functions as a request quark at that node.

Referring further to FIG. 2, the components of request quark 50 will next be described. Conflict quarks and response quarks have the same components, but their descriptions must be adapted to reflect that they are components of a quark being sent rather than a request quark 50 which has been received. Throughout this specification, as will be apparent to those skilled in the art, names, indicators, codes, keys, and states are represented by electrical signals being communicated between or stored, for example, in registers or storage locations within the storage space at a node or in the communication channels between nodes. A request quark 50 contains the following components:

1. This node data file name 52 is the name used at this node 20 to identify the data base to which this quark 50 pertains.

2. This node data atom name 54 is the name used at this node 20 to identify the data atom type to which this quark 50 pertains.

3. Referent node data file name 58 is the name by which the referent node 30 knows the data file at the referent node.

4. Data atom key(s) 60 specifies the set of one or more data atoms to which this quark 50 pertains.

5. Desired dipole half 62 is the dipole half which the requesting node desires this node 20 to store in its status and control (SAC) file. (The SAC file is described by Daniell, et al, supra, in connection with their FIG. 1.) Desired dipole half 62 differs in format from a dipole half stored in the SAC file in that it specifies a set of ACCESS-CONTROL values. Any one of the values in the set is acceptable in processing quark 50.

6. Data accompanies indicator 64 specifies whether or not a copy of the data atom accompanies the quark. It takes one of two values: N, meaning data does not accompany this quark; D, meaning data does accompany this quark. The semantics of the D value depends on the quark function: (1) for a request quark, all data currently at this node 20 which is described by this quark 50 should be deleted and the new data, if any, inserted; (2) for a response quark, all data described by this quark should be copied and sent along with this quark; and (3) this value never occurs with a conflict quark.

Figure 10A:
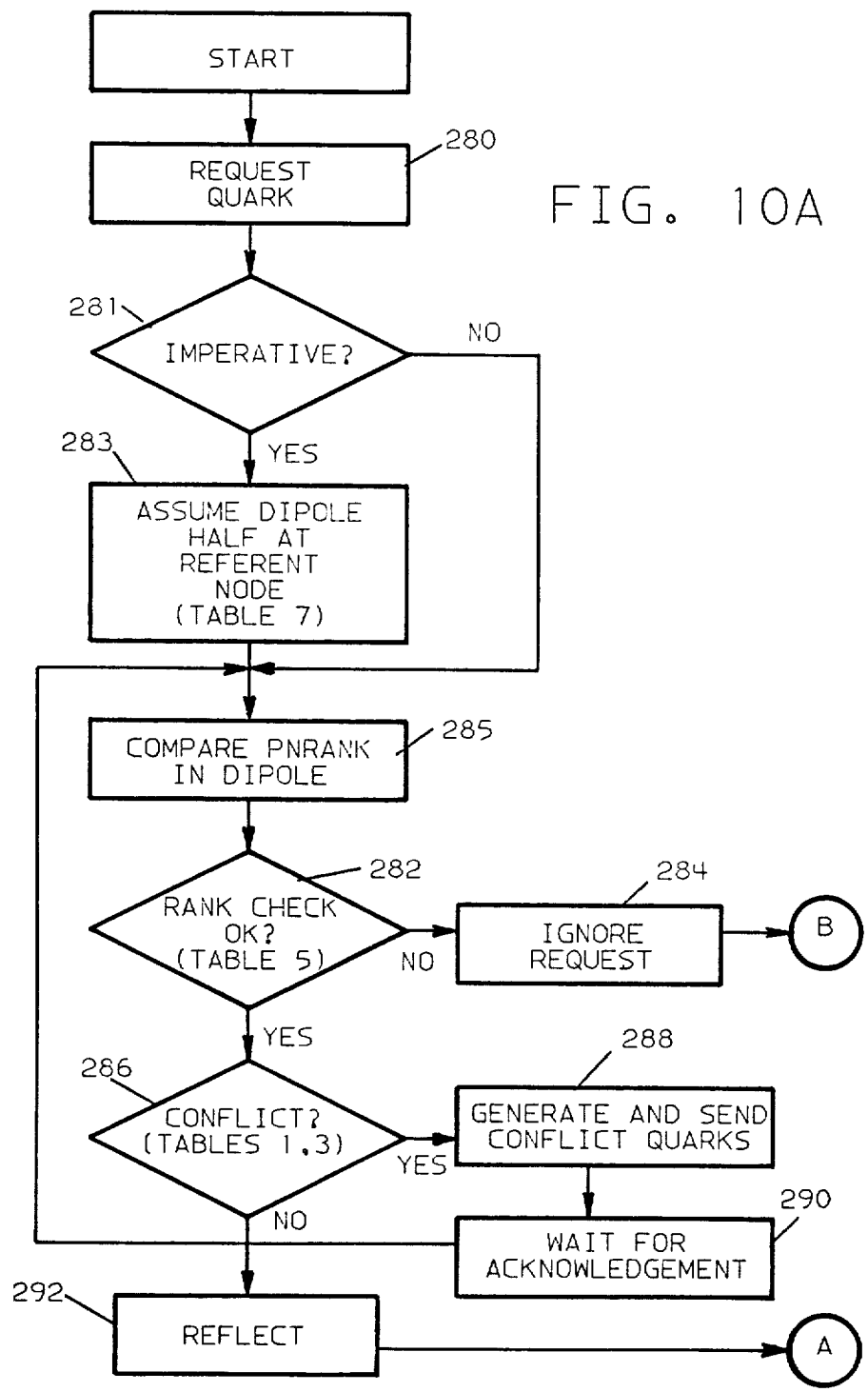
FIGS. 10A and 10B are a flow chart illustrating the steps of the invention for asynchronous communication and processing of dynamic replication messages.
Figure 10B:
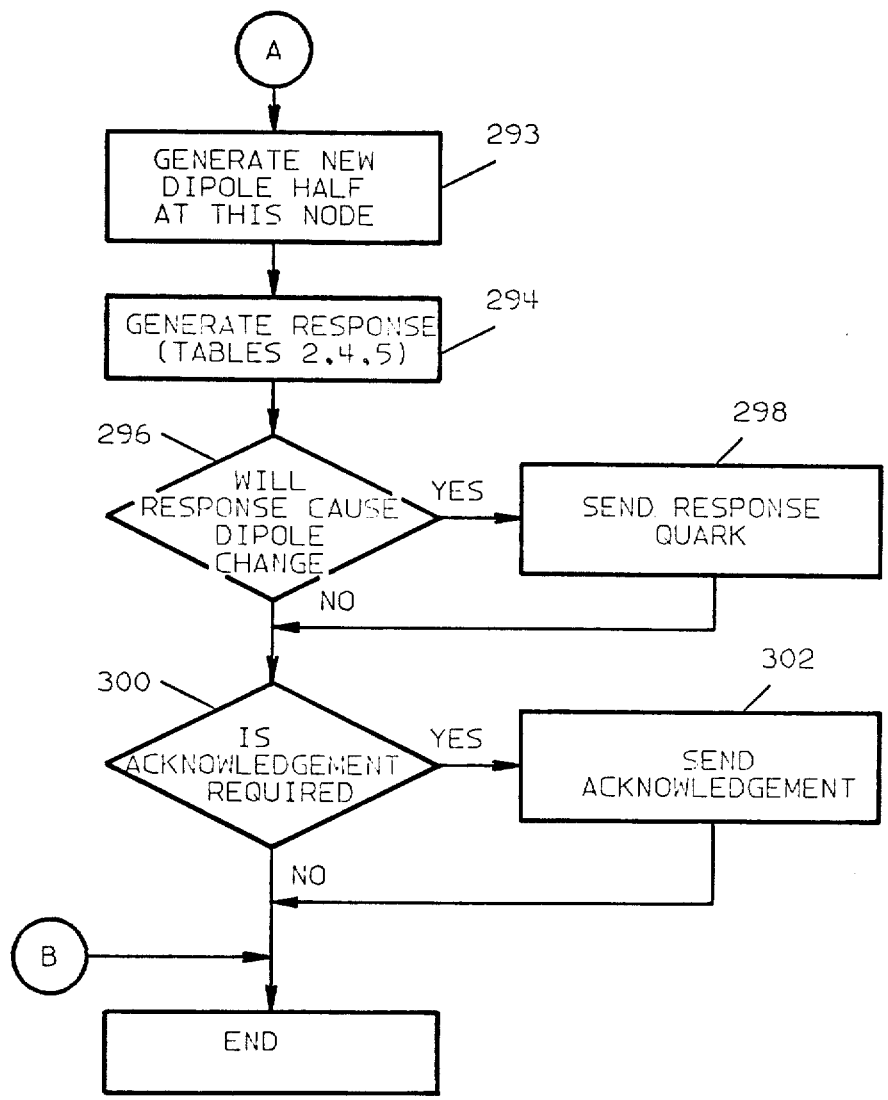

7. Current dipole half at referent node 66 includes any changes made at the origination node when the quark was generated. This provides the means, when the origination node and the referent node are the same, to send as part of the quark the dipole half at the referent node. When the origination node differs from the referent node, or when the quark is generated by a local application program, utility, or operator facility, the assumed dipole half is generated by this node 20, as will be further described hereafter in connection with step 283, FIG. 10A. The following elements are included in field 66: (a) current access control and quality control being the access control and quality control stored in the SAC file at the origination node at the time that the quark was sent to this node 20; and (b) current rank elements, including current paired rank element (QPNRANK) and current value held by paired node 30 for this node 20 rank element (QTNRANK), both as will be described hereafter.

8. Acknowledgement desire indicator 68, providing an indication of whether or not the origination node desires an acknowledgement for this quark.

9. Quark return code/reason code 70.

Some quarks may not include the current dipole half at the referent node 66. Such quarks are part of a dynamic replication request called an imperative request. An imperative request is a request at a node on behalf of a local application program, operator facility, or utility. An imperative request is made without regard to the current state. It is an imperative request originating somewhere in the network of nodes, such as in FIG. 1, which initiates a sequence of request processing. Examples of request processing sequences will be described hereafter in connection with FIGS. 5 and 6. All other quarks, containing all quark components, are generated as a part of the processing of an imperative request.

Referring now to FIG. 3, a dynamic replication message 80 from a referent node to a destination node contains the following information:

1. Referent node name 82.
2. Origination node reflection ID 83, if any.
3. Destination node name 84.
4. Referent node reflection identifier (ID) 86, if any. Processing at the referent node may be waiting on a reply to this dynamic replication message 80. If processing is waiting, then some identification of that processing is sent in the referent reflection ID field 86. When the destination node prepares a reply, it returns this ID in the destination reflection ID field 88.
5. Destination node reflection identifier 88, if any. Processing at the destination node may be waiting on this dynamic replication message 80. That processing is identified by the destination reflection identifier 88, and is used at the destination node to determine locking requirements and in notifying the waiting process when this dynamic replication message 80 has been received and successfully processed at the destination node.
6. Origination node reflection identifier 90, if any, is used to notify a waiting utility; for example, to notify a conformation utility that conformation had been acknowledged by the node to be conformed, as will be described further hereafter.
7. Set of request quarks 92. A dynamic replication message 80 includes in field 92 one or more quarks 50, such as that described above with respect to FIG. 2.
8. Data 94 can accompany a dynamic replication message, as determined by the data accompanies indicator 64 in the individual request quarks 50 in set 92.

Figure 4:
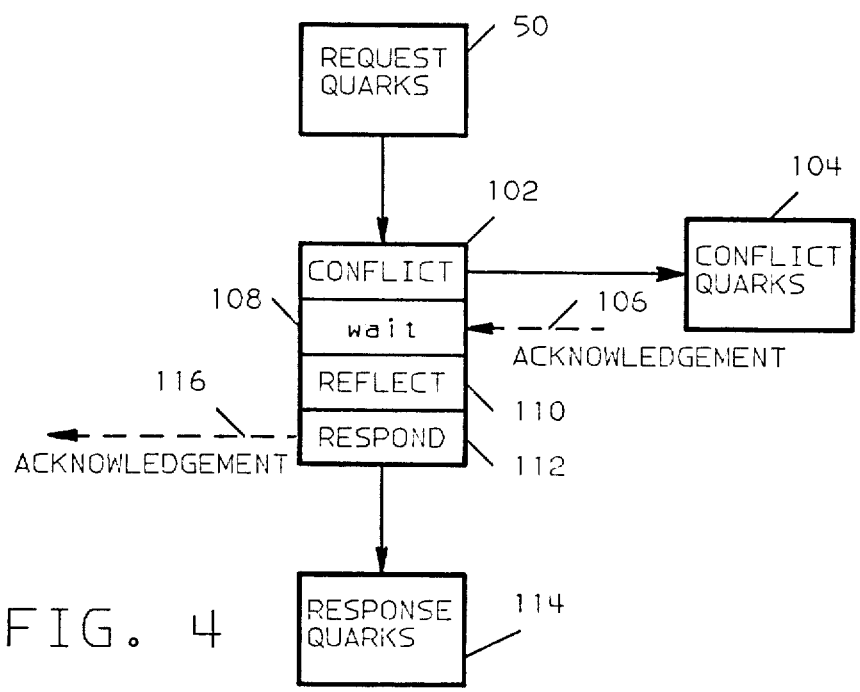
FIG. 4 is a diagrammatic illustration of a quark processing unit.

Referring now to FIG. 4, a description of the fundamental unit of quark processing will be provided. The manner in which multiple instances of this unit are combined to accomplish the processing of an imperative request will hereafter be described in connection with FIGS. 5 and 6. These will be described in greater detail in connection with FIGS. 10, 18-21.

A request quark 50 processing unit comprises conflict determination procedure 102, wait 108, request reflection procedure 110, and response generation procedure 112.

Conflict determination procedure 102 determines whether or not any conflict would result from changing the paired node 30 dipole half as specified by the desired dipole half 62 for the referent node (say, 30) in quark 50. The data atom keys 60 in request quark 50 are used to select those dipole halves 23, 25, 27 which describe any of the same data atoms for nodes other than the paired node 30, that is for other nodes related to this node 20. Each dipole half 23, 25, 27 for such other node 22, 24, 26 is compared to the desired dipole half for the referent node 30. If there is a conflict, then a change is possibly made to the dipole half, say 23, for the other node 22 and a conflict quark 104 is generated to be sent to other node 22.

If any conflicts were found, then the quark processing unit of FIG. 4 waits 108 until notified through acknowledgement 106 that all the conflicts have been resolved before processing the request.

Request reflection procedure 110 determines whether or not any dipole halves for other nodes 22, 24, 26 related to this node 20 need to be modified as a result of the change to the dipole half 31 for the paired node 30. For example, if request quark 50 is accompanied by a new data atom value 94, then the QUALITY-CONTROL dipole element of the dipole halves for all other nodes 22, 24, 26 related to this node 20 for that data atom 94 must be marked to indicate that those other nodes 22, 24, 26 now have WORSE data than this node 20.

Response generation procedure 112 changes the dipole half 31 for paired node 30 to reflect processing of request quark 50. It may generate a response quark 114 to the referent node, say 30, an acknowledgement to the origination node, say 40, both or none. A response quark 114 is generated when the desired dipole half in the response quark 114 would be different from the current dipole half in the request quark 50. If the data accompanying indicator 64 has the value D (data does accompany) for a quark, then that data 94 must be moved into the data base as part of quark processing. This can occur either before or after reflect procedure 110 but must occur before respond 112.

Figure 5:
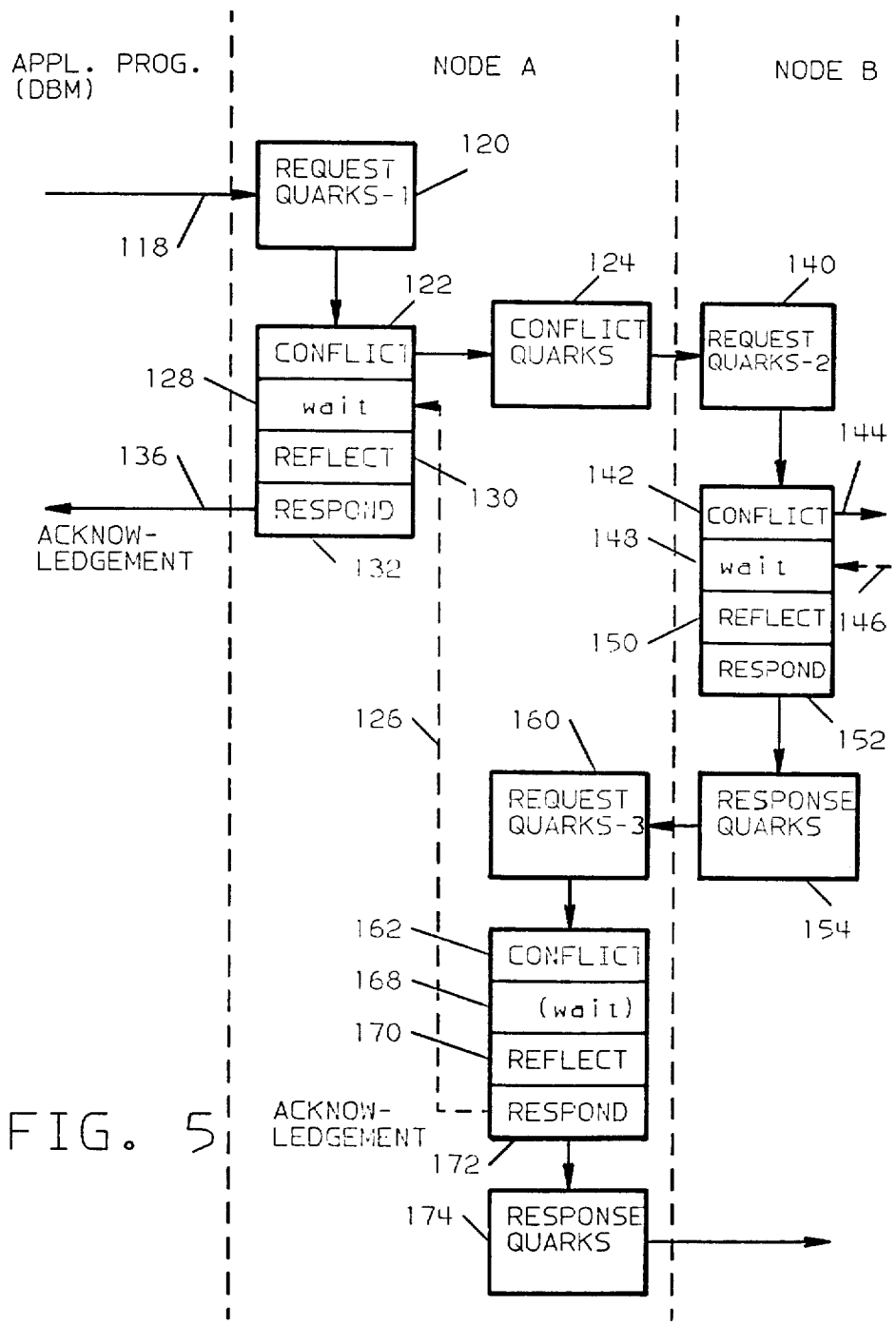
FIG. 5 is a diagrammatic illustration of the processing of a data call request.

Referring now to FIG. 5, a description will be given of the manner in which a plurality of fundamental units of the quark processing procedure set forth in FIG. 4 are applied in processing a single application or data call request 118, such as may be issued by a data base manager on behalf of an application program, as is described in Daniell, et al, supra.

The requirements of applicaiton call 118 at node A are expressed as an imperative request, or request quarks 120. Conflict procedure 122 determines that there are conflicts at one or more other nodes and generates conflict quarks 124 to be sent to those other nodes. One such node, node B, is illustrated.

At each of the other nodes (in this illustration, node B) the conflict quarks 124 become request quarks 140 and are processed by additional instances of the quark processing unit, comprising procedures 142, 148, 150, and 152. When request quark 140 is processed at a node B, conflicts may be found at still other nodes, and the process recurses 144. Eventually, these additional conflicts are resolved, wait 148 is notified 146, and processing of request quark 140 continues 150, 152.

The dipole half at node B for node A is modified by respond 152 to allow removal of the original conflict at node B. Respond 152 generates response quarks 154 which are sent back to node A where they become request quarks 160. Data accompanies the response quarks 154 as determined to be necessary by node B.

Request quarks 160 are process by yet another instance of the quark processing unit. In this case, which is the response to a conflict request, no conflicts can be found by conflict procedure 162; however, dipole halves for other nodes may need to reflect the conflict processing as determined by reflect procedure 170. If data accompanies a request quark 160, then that data is moved into the data base at node A. In any case, respond 172 changes the dipole half at node A for node B to remove the original conflict as viewed by node A. Response quarks 174 back to node B are generated and sent as determined by respond 172. There is an instance of request quark 160 and the quark processing unit which processes it for every other node (including node B) to which conflict quarks 124 were originally sent.

When respond 172 finishes processing of request quark 160, the conflict with node B has been removed, and the wait 128 in the quark processing unit for request quark 120 is given an acknowledgement 126. When acknowledgements are received instances of the quark processing unit which are processing responses from all other nodes with which there were conflicts, the wait 128 is satisfied and processing of request quark 120 continues. Reflect 130 reflects the request quark 120 onto dipole halves for other nodes as required. Since the request quark 120 originated from an application call at node A (that is, the application call process is synchronous with the quark processing unit) respond 132 does not have to change any dipole, nor generate any response quark. The acknowledgement 136 mechanism is used to revive a suspended application call processing structure.

Figure 6:
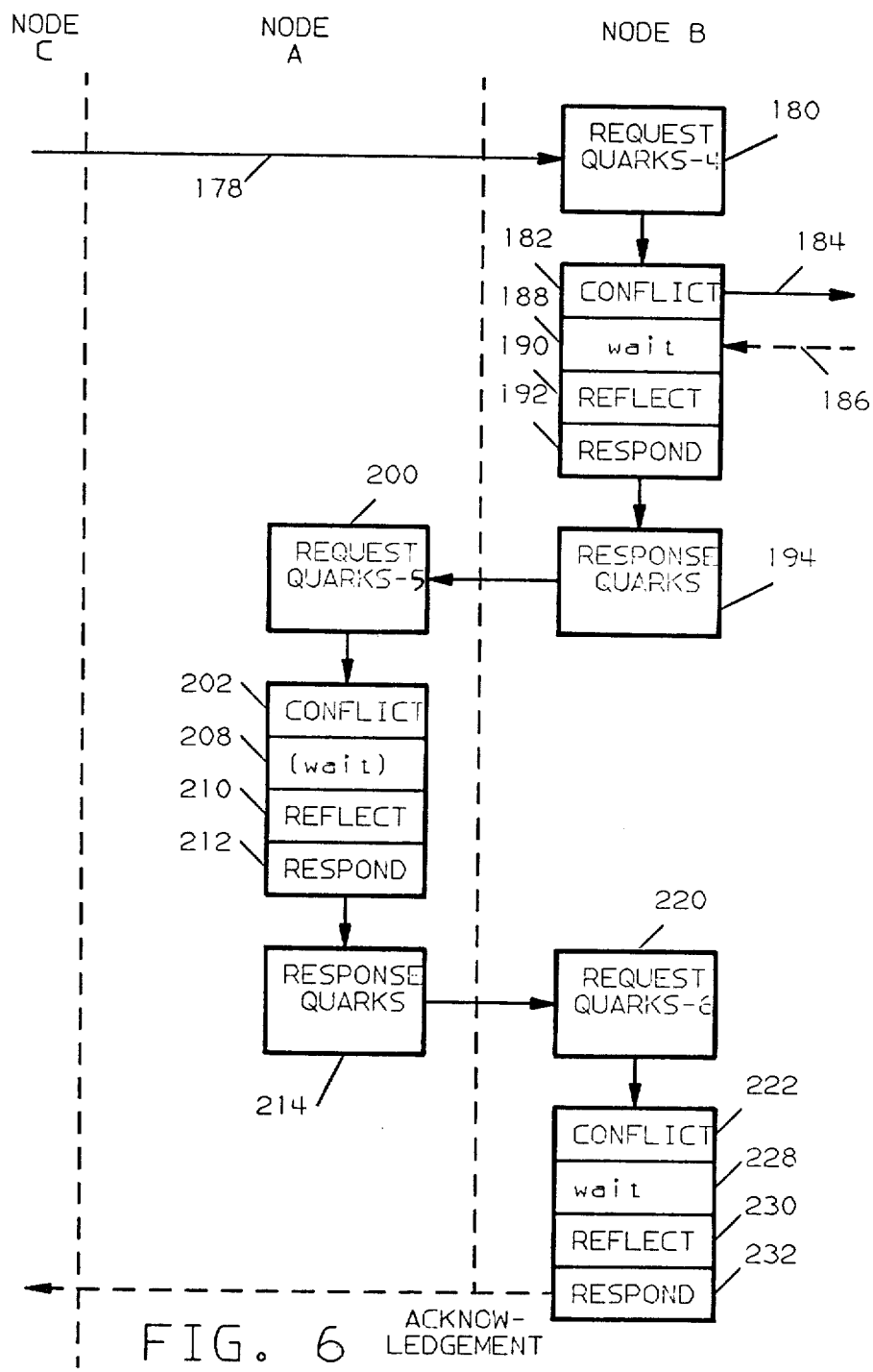
FIG. 6 is a diagrammatic illustration of the processing of a utility call request.

Referring now to FIG. 6, a description will be given of the manner in which a plurality of fundamental units of the quark processing procedure set forth in FIG. 4 are applied in processing a utility call. A utility call is a special case of an application call in that the utility call is formulated at a node (node C) as though it came from another node (node A).

Multiple instances of the quark processing unit (FIG. 4) are applied in the processing of a single utility call 178 as is shown in FIG. 6 which shows, for purposes of illustration, the conformation of node A to a change at node B. A utility, running at node C, determines that it will cause node A to conform to better data at node B. The utility generates an imperative request 178 for node B with the referent node being node A.

Imperative request 178 is accepted at node B, where it becomes request quark 180. Conflict 182 may determine that there are conflicts (e.g., still better data) at one or more other nodes, not shown, and generates conflict quarks to be sent 184 to those other nodes. Eventually these conflicts are resolved, and wait 188 is notified 186, whereupon processing of request quark 180 continues. The dipole half at node B for node A may be modified by respond 192 as part of the original utility call 178 at node B. Respond 192 generates response quarks 194 which are sent to node A where they become request quarks 200. Data accompanies the response quarks 194 as determined by node B.

Request quarks 200 are processed by an instance of the quark processing unit at node A. In this example, no conflicts will be found by conflict 202. Dipole halves for other nodes may need to reflect the better data received at node A as determined by reflect 210. Since data accompanies request quarks 200, then that data is moved into the data base at node A. Respond 212 changes the dipole half at node A for node B and generates response quarks 214 back to node B, where they become request quarks 220.

Request quarks 220 are processed by yet another instance of the quark processing unit at node B. In this example, no conflicts will be found by conflict 220, nor will dipole halves for other nodes need to reflect the processing of request quarks 220, as determined by reflect 230. Respond 232 finishes processing of request quark 220 by changing the dipole half for node A to show the receipt of better data. Since the imperative request 178 contains an origination node reflection id for node C, respond 232 generates and sends 236 an acknowledgement. The processing of the utility call 178 has been completed.

Figure 7:
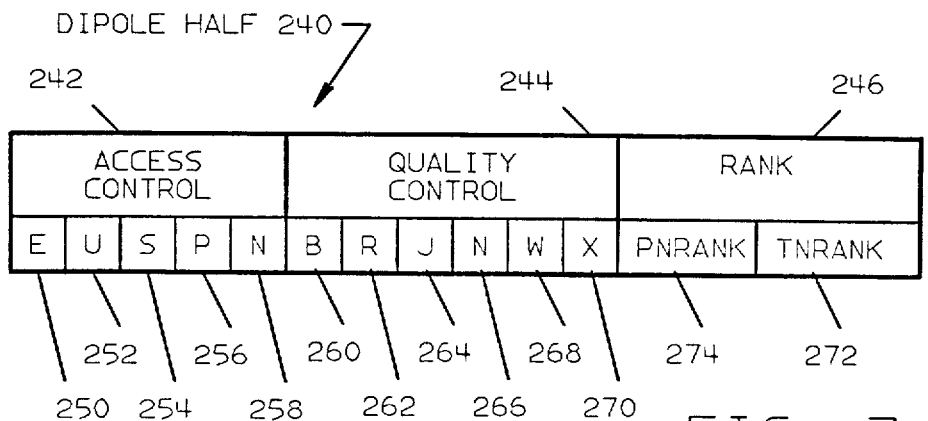
FIG. 7 is an illustration of the format of a dipole half.

Referring now to FIG. 7, a description of the dipole half 66 (FIG. 2) at a node will be provided. FIG. 7 illustrates a dipole half 240. Each dipole half 240 comprises three dipole half elements: access control 242, quality control 244, and rank 246. Element values 250-274 are defined from the viewpoint of this node 20, which has stored a dipole half 240 containing the given value on behalf of a paired node 30. These two nodes constitute a node pair, the state of which is described by a dipole consisting of two dipole halves 240.

In this explanation, reference is made to clean and prior copies of data atoms 94. A clean copy of a data atom contains the latest committed value for the given data atom. A prior copy of a data atom contains a committed value for the given data atom, but it is not necessarily the latest such value. A copy of a data atom is considered to always be either clean or prior.

Since the two halves of a dipole are held at two different nodes, such as 20, 30, these two nodes must coordinate any changes to the value of the dipole; otherwise, a data base integrity exposure can result. This exposure arises because the two dipole halves 240 of a dipole are not modified in the same scope of recovery, and the exposure is compounded by possible unreliability in the communications subsystem interconnecting the nodes. Thus, dynamic replication messages 80 between two nodes may be lost or arrive out of order, and independently initiated but conflicting dynamic replication messages 80 may pass like "two ships in the night" between the two nodes. By this invention, however, the individual dipole half 240 elements are, by and large, treated independently. The requirements for changing dipole halves 240 are governed by Tables 1-7, to be described hereafter, wherein the single node validity Tables 1 and 3 specify constraints on the dipole half element values which can appear at any instant of time in the set of dipole halves 240 at a single node for a given data atom, the node pair validity Tables 2 and 4 specify constraints on the element values 250-270 which can appear at any instant of time in the two dipole halves 240 held by a node pair 20.30 that share a given data atom, and the safe transition list (Rank Preprocessor Decision) Table 5 specifies which node may make the first half of a dipole change.

Access control element 242 of dipole half 240 describes the view of this node 20 of the accessibility of data with respect to paired node 30. Access control 242 can assume one of the values exclusive (E) 250, unique clean (U) 252, shared clean (S) 254, prior (P) 256, or not accessible (N) 258.

Access control 242 = exclusive (E) 250 specifies that a node (such as node 36, but not node 22, as is described, supra) in the window of this node 20 to paired node 30 may be modifying and committing modifications to the data atom described by dipole half 240. No node in the window of paired node 30 to this node 20 can access a copy of the data atom.

Access control 242=unique clean (U) 252 specifies that a node in the window of this node 20 to paired node 30 may be modifying and committing modifications to the data atom described by dipole half 240. No node in the window of paired node 30 to this node 20 can modify or commit modifications to the data atom described by dipole half 240.

Access control 242=shared clean (S) 254 specifies that neither a node in the window of this node 20 to paired node 30, nor a node in the window of paired node 30 to this node 20, can modify or commit modifications to the data atom described by dipole half 240.

Access control 242=prior (P) 256 specifies that no node in the window of this node 20 to paired node 30 can modify or commit modifications to the data atom described by dipole half 240. A node in the window of paired node 30 to this node 20 may modify and commit modifications to data atoms described by dipole half 240.

Access control 242=not accessible (N) 258 specifies that no node in the window of this node 20 to paired node 30 can access a copy of the data atom. A node in the window of paired node 30 to this node 20 may modify and commit modifications to the data atom described by dipole half 240.

Referring now to Table 1, each row represents one of the valid combinations of access control element 242. Table 1 specifies the limits on the count of how many times a given access control value N, P, S, U, or E can occur in a dipole half at this node 20 for any given data atom. When the number of all control values N, P, S, U, and E in all dipole halves for the given data atom are summed, the totals must match one of the rows in Table 1. By inspection of Table 1, for example, the values E and U can never occur at this node 20 at the same time for the same data atom.

Referring now to Table 2, a matrix is presented specifying at each row and column intersection whether or not the corresponding access control values 242 (EUSPN) at this node 20 and paired node 30 are valid.

(The use of Tables 1-12 will be described hereafter in connection with FIGS. 10-21.)

Figure 8:
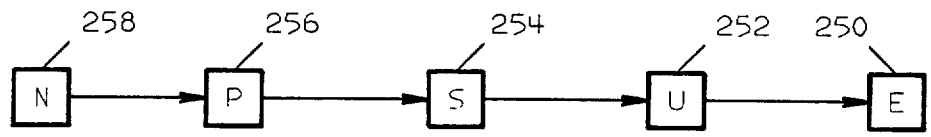
FIG. 8 is an illustration of permissible unilateral access control state changes.

FIG. 8 illustrates the transitions in access control values which are always safe and can be made unilaterally by a node 20. Thus, at any time and without communication with any other node, node 20 can change the access control value 252 of a dipole half 240 from N 258 to P 256, from P 256 to S 254, from S 254 to U 252, and from U 252 to E 250.

Quality control 244 describes (1) the relative quality difference between the data available at or through paired node 30 and the data held at this node or available through an other node 22, 24, 26, 30 related to this node 20, and (2) which node (this node 20 and/or paired node 30) is responsible for being able to obtain a clean copy of the given data atom on behalf of the other. Quality control 244 can assume any one of the values better (B) 260, responsible (R) 262, joint (J) 264, not responsible (N) 266, worse (W) 268, or receiving (X) 270. With respect to the prior Daniell, et al, application, the corresponding equivalent definitions are as follows: quality control =B is equivalent to "better, yes"; quality control=R is equivalent to "no known difference, yes"; quality control=J is equivalent to "no known difference, both"; quality control=N is equivalent to "no known difference, no"; quality control=W is equivalent to "worse, no"; and quality control=X is equivalent to "receiving, no".

Quality control 244=better (B) 260 specifies that this node 20 has been advised that the best quality data that is available at a node in the window of this node 20 to paired node 30 is of better quality than the best quality data that is available at a node in the window of paired node 30 to this node 20. Changes to the data have been made and committed by a node in the window of this node 20 to paired node 30. This node 20 has not received a copy containing these changes. Paired node 30 has accepted responsibility for being able to obtain a clean copy of the data atom on behalf of this node 20. Paired node 30 is not relying on this node 20 to be able to obtain a clean copy of the data atom on its behalf.

Quality control 244=responsible (R) 262 specifies that there is no difference known to this node 20 between the best quality data that is available at a node in the window of this node 20 to paired node 30, and the best quality data that is available at a node in the window of paired node 30 to this node 20. Paired node 30 has accepted responsibility for being able to obtain a clean copy of the data atom on behalf of this node 30. Paired node 30 is not relying on this node 20 to be able to obtain a clean copy of the data atom on its behalf.

Quality control 244=joint (J) 264 specifies that there is no difference known to this node 20 between the best quality data that is available at a node in the window of this node 20 to paired node 30, and the best quality data that is available at a node in the window of paired node 30 to this node 20. Paired node 30 has accepted responsibility for being able to obtain a clean copy of the data atom on behalf of this node. Paired node 30 may be relying on this node 20 to be able to obtain a clean copy of the data atom on its behalf.

Quality control 244=not responsible (N) 266 specifies that there is no difference known to this node 20 between the best quality data that is available at a node in the window of this node 20 to paired node 30, and the best quality data that is available at a node in the window of paired node 30 to this node 20. This node 20 can not rely on paired node 30 to be able to obtain a clean copy of the data atom. Paired node 30 may be relying on this node 20 to be able to obtain a clean copy of the data atom on its behalf.

Quality control 244=worse (W) 268 specifies that the best quality data that is available at a node in the window of this node 20 to paired node 30 is of worse quality than the best quality data that is available at a node in the window of paired node 30 to this node 20. Changes to the data have been made and committed by a node in the window of paired node 30 to this node 20. This node 20 has not sent a copy containing these changes to paired node 30. This node 20 can not rely on paired node 30 to be able to obtain a clean copy of the data atom. Paired node 30 may be relying on this node 20 to be able to obtain a clean copy of the data atom on its behalf. The value quality control=W may be used, among other things, to trigger conformation processing.

Quality control 244=receiving (X) 270 specifies that the best quality data that is available at a node in the window of this node 20 to paired node 30 may be of worse quality than the best quality data that is available at a node in the window of paired node 30 to this node 20. Changes to the data have been made and committed by a node in the window of paired node 30 to this node 20, and this node 20 has sent a copy containing those changes to paired node 30. Paired node 30 has not yet responded to indicate receipt of the copy. This node 20 can not rely on paired node 30 to be able to obtain a clean copy of the data atom. Paired node 30 may be relying on this node 20 to be able to obtain a clean copy of the data atom on its behalf.

Referring now to Table 3, each row represents one of the valid combinations of the quality control element 244. There is a column for each of the values which quality control 244 can assume. A count can be made of how many times each quality control value 260-270 occurs in all dipole halves 240 at a given node for a given data atom. The counts obtained for each quality control value 260-270 must match one of the rows of Table 3. For example, the values B and R can never occur at the same time for the same data atom.

In Table 4 are specified the valid and invalid combinations for quality control 244 in the dipole halves 240 at this node 20 and paired node 30 for a given data atom. The value "invalid" indicates that state combination represented by the row and column in which it appears is not allowed to occur. The value "ok" indicates acceptable combinations.

Figure 9:
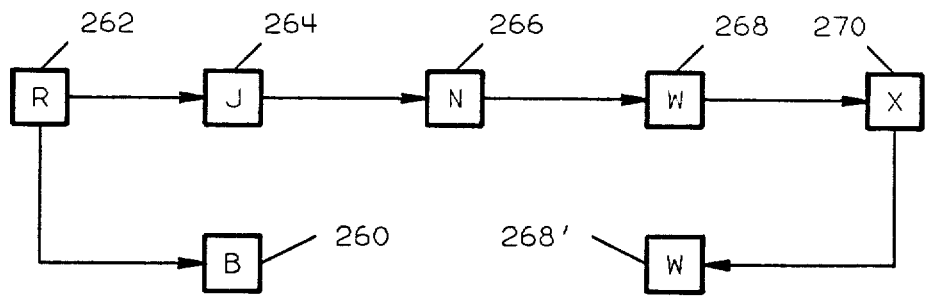
FIG. 9 is an illustration of permissible unilateral quality control state changes.

Referring to FIG. 9, the transitions in the state of quality control 244 which are safe, and can be made unilaterally by a node at any time, are illustrated. Thus, the quality control value 244 at a node may change from R 262 to J 264, from J 264 to N 266, from N 266 to W 268, from W 268 to X 270. Subject to certain constraints, a transition may be made at a node from state R 262 to B 260, and from state X 270 to W 268. The transition from R 262 to B 260 is done to expunge data which also requires that access control = E. The transition from X 270 to W 268' is made when better data or advice of better data is received from another node.

Referring once again to FIG. 7, the rank elements 246, including this node rank (TNRANK) 272 and paired node rank (PNRANK) 274, will be described. These two rank values 272 and 274 are used to detect and resolve synchronization incidents resulting from the use of asynchronous communication in the dynamic replication facility of the invention.

Each node, say 20 and 30, must have the capability of generating one or more ranking values. A ranking value is a value that monotonically increases every time it is interrogated. No relationship between ranking values at the same node or between nodes is assumed: that is, (1) the various values 272, 274 need not be synchronized and (2) they may increase at differing rates. Thus, a local clock can be used for the ranking value at a node.

Figure 22:
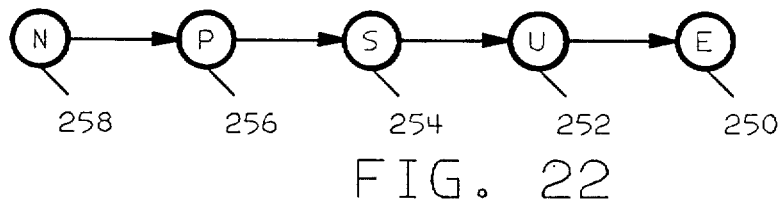
FIG. 22 is a diagrammatic representation of changes in access control values which are significant events.
Figure 23:
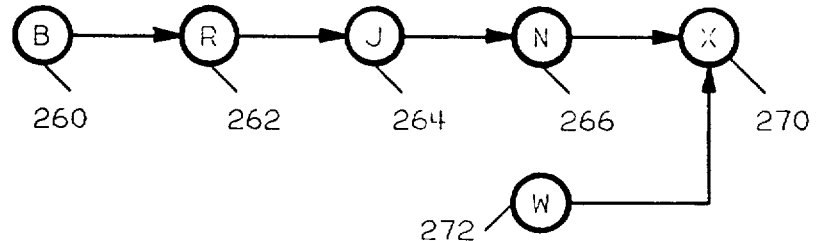
FIG. 23 is a diagrammatic representation of changes in quality control values which are significant events.

Referring to FIGS. 22 and 23, this node rank (TNRANK) 272 takes on the value of the ranking value at this node 20, and thus increases, at least upon the occurrence of any of the following significant events at this node 20: (1) access control 242 changes in the direction from N 258 to P 256 to S 254 to U 252 to E 250; or (2) quality control 244 changes in the direction from B 260 to R 262 to J 264 to N 266 to X 270, or from W 268' to X 270.

Paired node rank (PNRANK) 274 is the largest ranking value received so far at this node 20 from paired node 30 in a message relating to the given data atom. A message to this node 20 from paired node 30 includes the ranking value at paired node 30 at the time the message was sent. If the ranking value in a message 80 (which will be included in the PNRANK 274 field of dipole half 240 in current dipole half field 66 of quark 50) from paired node 30 is larger than PNRANK 274 in the dipole half 240 at this node 20, then that value in message 80 replaces PNRANK 274 in the dipole half, at this node 20. This signifies that the state at this node 20 has been made to correspond to a significant state change at paired node 30. Subsequent messages from this node 20 to paired node 30 will include PNRANK 274. In fact, both rank elements 272 and 274 are sent as part of an outgoing quark 50 in current dipole half field 66.

Referring now to FIG. 10, a more detailed description will be provided. In step 281, the request quark 280 is identified as an imperative. An imperative is recognized as a request which does not include the current dipole half at referent node (field 66), and could be, for example, one of those requests (desired dipole half 62) listed in Table 6 under the column heading "user requirement". If so, Table 7 is referenced to assume the dipole half at the referent node, as will be further described in connection with, for example, FIG. 12 element 481.

When an incoming quark 280 is processed, the rank values 272 and 274 sent with the quark are compared to those stored at the receiving node. The results of this comparison determine whether the request will be processed or rejected, as will be described in connection with Table 5. Table 12 sets forth in the PL/1 language a statement of the rank processing procedure executed in processing rank values 272 and 274.

Let QPNRANK be the value in a request quark 280 to be compared with PNRANK at this node 20. (When this request quark 280 was formed as an outgoing quark at paired node 30, paired node 30 placed its current value for TNRANK in what is now QPNRANK at this node.) Further, let QTNRANK be the value in request quark 280 to be compared to TNRANK at this node 20. (When this request quark 280 was formed as an outgoing quark at paired node 30, paired node 30 placed its current value for PNRANK in what is now QTNRANK at this node 20.)

Thus, before state processing occurs, commencing at step 286, a rank check is performed at step 282 in which the ranks 246 in quark 280 from paired node 30 are compared to the ranks in dipole half 240 at this node 20 according to the tests set forth in Table 5, as follows.

Referring to Table 5 case 1, if QPNRANK is less than PNRANK, the message containing quark 280 is rejected 284 and the paired node rank is not saved. The current message 280 has arrived out of order. It is ignored 284.

Similarly, for case 2, where QPNRANK equals PNRANK and QTNRANK is less than TNRANK, the message including request quark 280 is rejected 284, and the paired node rank is not saved. Paired node 30 has not received the most recent significant message from this node 20. No handshaking is required, request 280 is merely ignored 284.

Case 3 is the normal case, where QPNRANK is equal to or greater than PNRANK and QTNRANK equals TNRANK. PNRANK is set equal to QPNRANK (the paired node rank is saved) and quark 280 is processed, beginning with step 286. Case 3 results when significant messages have been processed in order at both nodes 20, 30.

Case 4 can never happen: where QPNRANK is equal to or greater than PNRANK and QTNRANK is greater than TNRANK.

Case 5 occurs when rank check 282 determines that QPNRANK is greater than PNRANK and QTNRANK is less than TNRANK. This situation indicates that this node 20 and paired node 30 have sent messages 80 which have passed like "ships in the night". One or more messages may have been lost. Both nodes 20 and 30 will detect this occurrence. One node will process its message, and the other node will reject its message according to a predetermined static criterion, is used. The "Rule" is that the node (20 or 30) that processes its message 280 saves QPNRANK in PNRANK; the node that rejects its message ignores QPNRANK.

Following range check 282, provided the result is not to ignore the request quark 280 received at this node 20, in step 286 a check is made for conflicting dipoles at this node 20 for the same data atom, using the criteria set forth in Tables 1–4. Step 286 is further described in FIG. 18. Any conflicts detected are resolved by generating conflict quarks 288 and waiting for acknowledgement 290, as has been previously described in connection with FIGS. 4–6. Step 288 is further described in FIG. 19.

Figure 18:
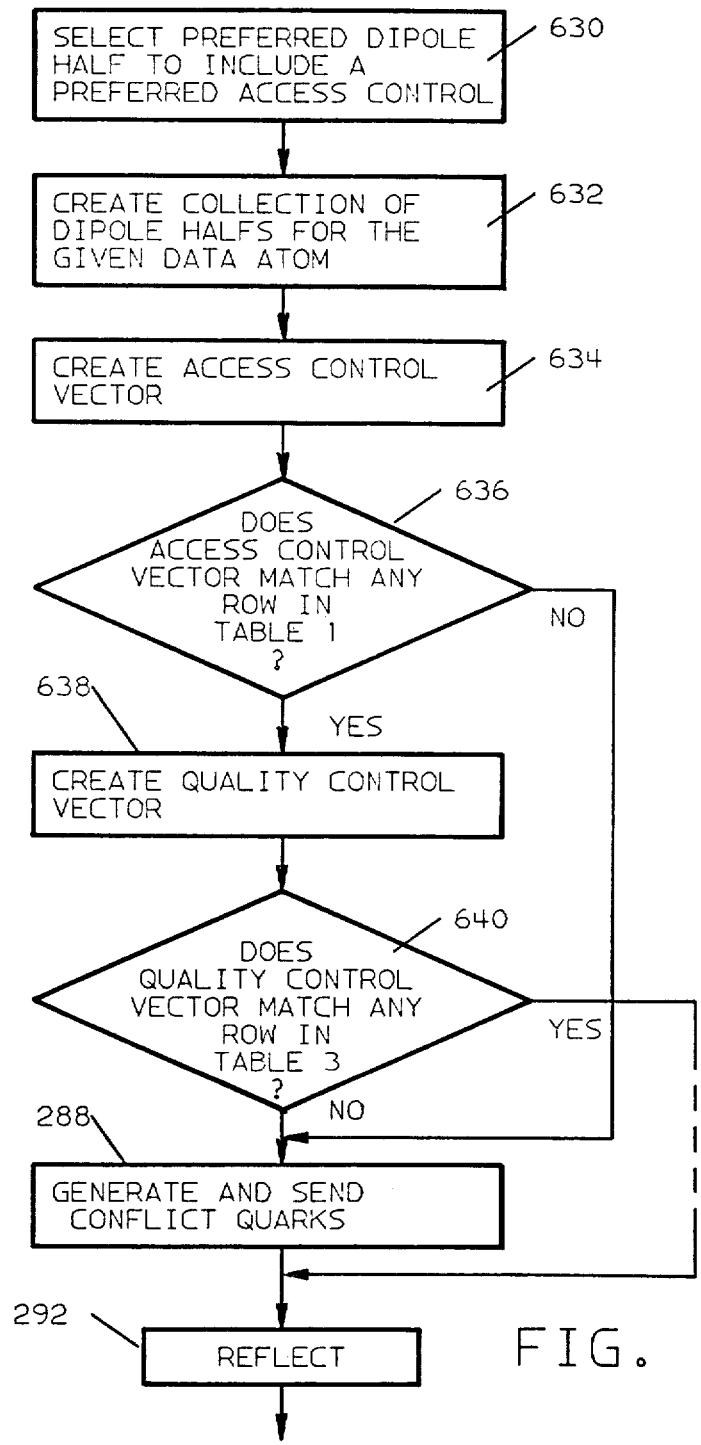
FIG. 18 is a flow chart further describing the conflict determination step 286 of FIG. 10A.

Referring to FIG. 18, in step 630, a preferred dipole half is selected to include a preferred access control selected from the set of desired access control values in the desired dipole half field of the request. One possible approach to selection of the preferred access control value is to select the least value. Thus, in an access control set "EUS..", access control=S would be selected. In step 632 a collection of dipole halves is created for the given data atom, the collection including the desired dipole half for the referent node (which is now assumed to have the value selected for the preferred dipole half in step 630) from the request and the dipole halves for all nodes other than the referent node. In step 634, the number of occurrences of each access control value appearing in that collection is used to create an access control vector. In step 636, the access control vector is analyzed with respect to Table 1 to determine if it matches any row. If not, then step 288 is executed to generate a conflict request. In step 638, the number of occurrences of each quality control value appearing in that collection is used to create a quality control vector. In step 640, that vector is examined to determine if it matches any row in Table 3. If not, then step 288 is executed to generate a conflict request. The calculation and use of the preferred dipole half and of the access control and quality control vectors will be further described in connection with FIGS. 12. . . , as will be the generation of the conflict request.

Figure 19:
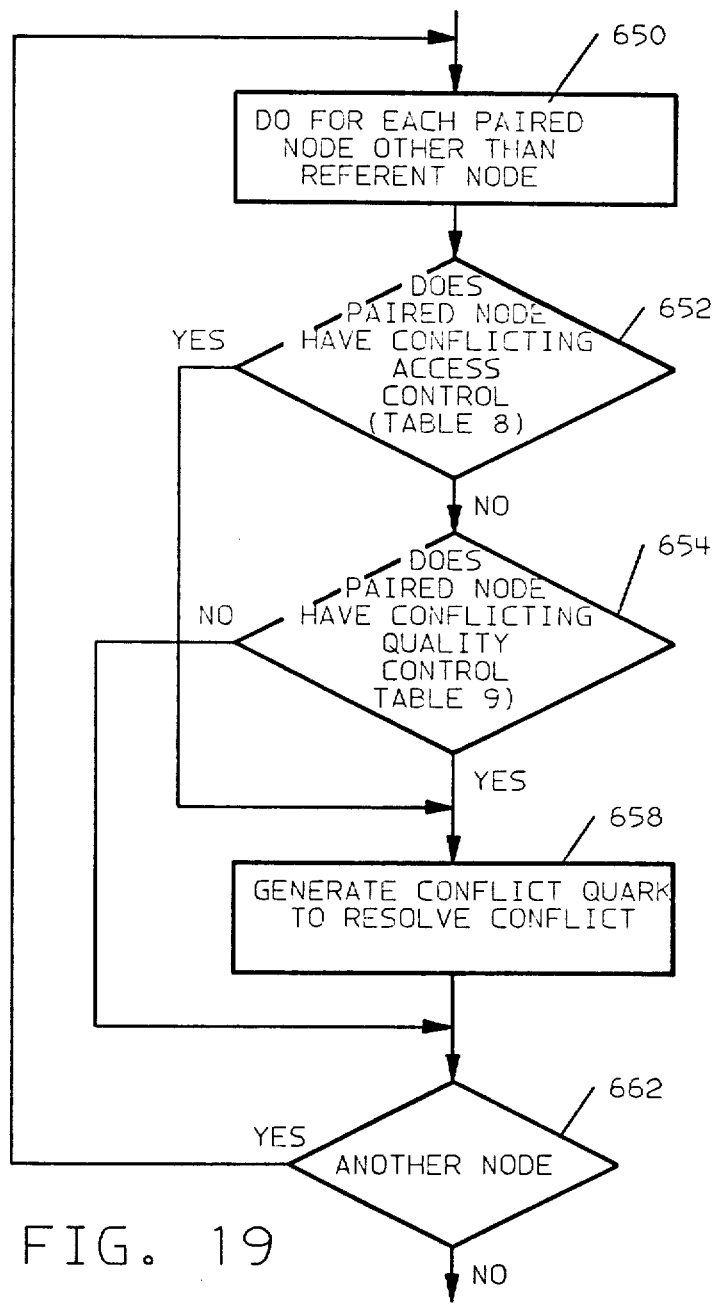
FIG. 19 is a flow chart further describing the generation of conflict quark step 288 of FIG. 10A.

Referring now to FIG. 19, steps 650 and 662 assure that each paired node other than the referent node is examined to determine if granting of the request will cause a conflict. In step 652, Table 8 is executed to determine if the paired node has conflicting access control. Thus, for a given desired access control value (Column 1), if the dipole half at this node for the paired node has one of the access control values shown in Column 2, then that paired node is in conflict. Thus, for a preferred, or desired, access control value of U, any dipole half already having at this node for a paired node an access control value of E or U or S will be determined to be in conflict. In step 654, Table 9 is executed to determine if the paired node has conflicting quality control with the dipole half of the request. Thus, a desired quality control of B or R or J or N or X conflicts with a quality control value of B in a dipole half for the data atom at this node for the paired node. In step 658, a conflict quark is generated to resolve conflict detected in either step 652 or, without unilateral change, in step 654. In step 658, a conflict quark is generated to be sent to the paired node, including in its desired dipole half the access control set from Column 3 of Table 8 corresponding to the desired dipole half in the request quark received at this node, and quality control value selected from Column 3 of Table 9 corresponding to the desired dipole half in the request quark received at this node.

In step 292, a determination is made if any dipole halves for other nodes related to this node 20 need to be modified at this node 20 as a result of the change to the dipole half for paired node 30 contained in request 280. If so, the modifications are made. If request quark 280 is accompanied by a new data atom value or a desired quality control of B, then the quality control dipole element 244 of the dipole halves 240 at this node 20 for all other nodes related to this node 20 for that data atom are changed to W to indicate that those other nodes now have worse data than this node 20.

Figure 20:
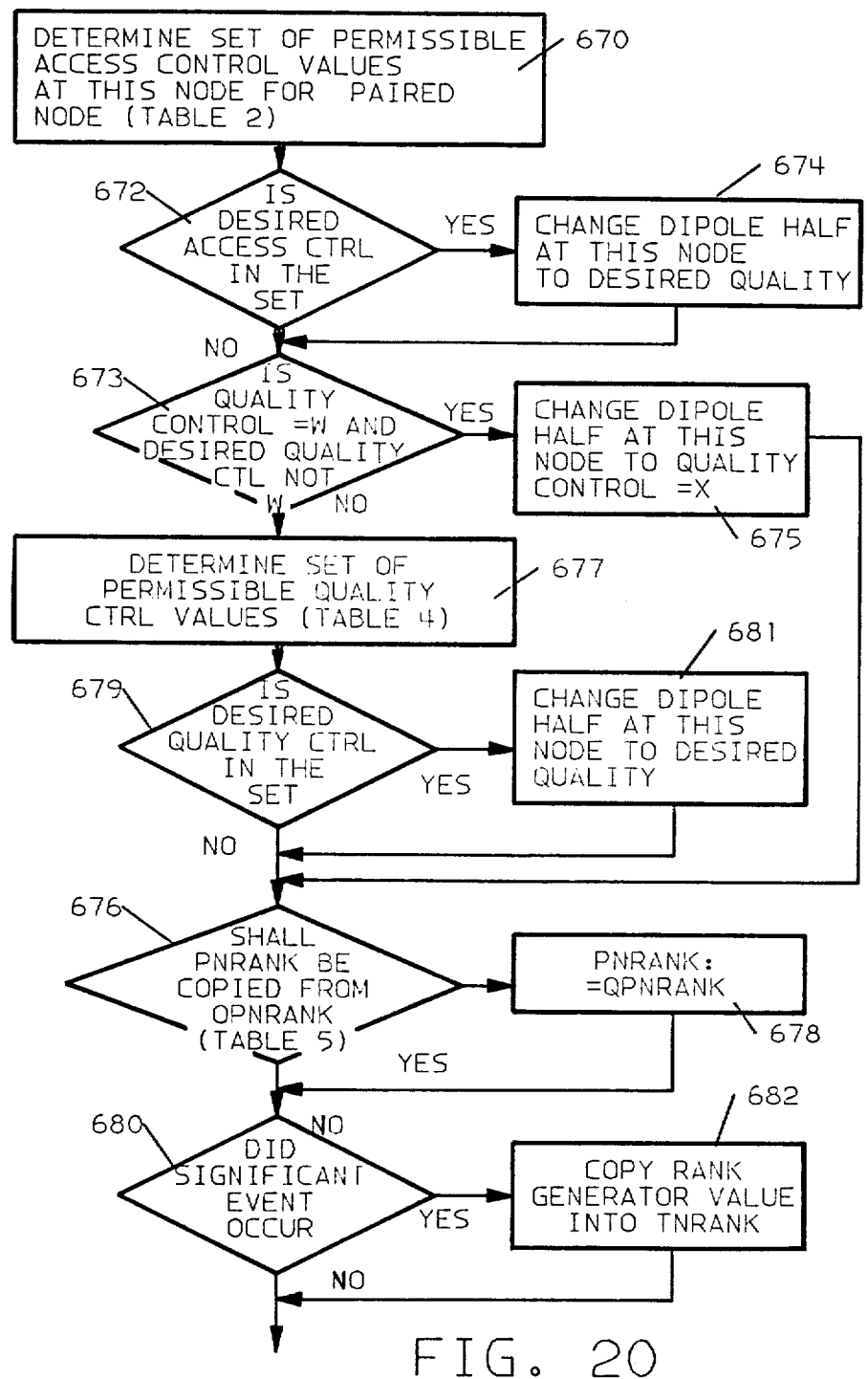
FIG. 20 is a flow chart further describing the generation of a new dipole half step 293 of FIG. 10B.

In step 293, the new dipole half to be stored at this node is generated. Step 293 is further described in FIG. 20. Referring to FIG. 20, in step 670 the set of all permissible access control values at this node for the paired node is determined by examination of Table 2. In steps 672 and 674, if the desired access control from the request quark is in the set determined in step 670, then the access control value in the dipole half at this node for the paired is changed to the desired value. In steps 673 and 675, if the quality control value at this node for the paired node is W, and the desired quality control value in the request quark is not W, the the quality control value at this node for the paired node is changed to X. In step 677, by reference to Table 4 the set of all possible quality control values at this node for the paired node is determined for the quality control value desired in the request quark. In steps 679 and 681, the dipole half at this node for the paired node is changed to the desired quality control if that desired quality control is in the set.

In step 676, Table 5 Column 3 is examined to determine if PNRANK is to be copied from QPNRANK in the request quark, as previously described. If so, in step 678 PNRANK is set equal to QPNRANK. In steps 680, 682, the rank generator value at this node is copied into TNRANK if a significant event has occurred, as previously defined.

Figure 21:
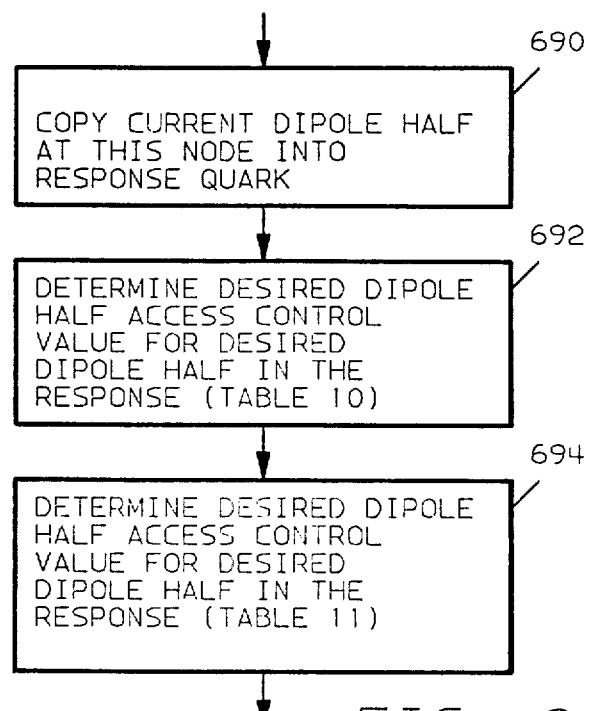
FIG. 21 is a flow chart further describing the generate response step 294 of FIG. 10B.

In step 294 the response is generated, as is further described in FIG. 21. If that response causes a change to the dipole (as is determined in step 296), in step 298 a response quark is sent from this node 20 to paired node 30. If, as is determined by step 300, an acknowledgement is required, then in step 302 it is sent to the destination or origination or referent node identified by a reflection ID in message 80. An acknowledgement is required (1) if there is an origination node reflection ID 90 or referent reflection node ID 86 in message 80 (FIG. 3), and no response quark is sent in step 298; or (2) if there is a destination reflection ID 88 in message 80. In FIGS. 5 and 6, acknowledgement 126 is to a destination node, 136 to a referent node, and 236 to an origination node.

Referring to FIG. 21, in step 690, the current dipole half at this node is copied into the response quark. In step 692, by use of Table 10 and for a given preferred access control value (as determined in step 630), the desired access control value is determined and copied into the response quark. In step 694, using Table 11 for a given desired quality control (from the request quark at received at this node) and preferred access control (from step 630), the desired quality control value for the response quark from this node is determined and copied into the desired dipole half of the response quark.

A default dipole half 240 is created at this node 20 if a dynamic replication request quark 280 is received from a node when no other data relationship has been established for the given data atom:

Access control=not accessible,
Quality control=worse,
TNRANK=0,
PNRANK=0.

A node is unrelated to another node for a data atom if and only if the node holds the default dipole half for the given data atom and the given other node. The dipole half for unrelated nodes has a default value which does not affect processing of requests from other nodes.

When a data base is initially distributed among the nodes, all nodes but one have a source node defined for each data atom. The following dipole half is created for the paired node which is identified as the source for the given data atom:

Access control=exclusive,
Quality control=better,
TNRANK=0,
PNRANK=0.

Some imperative requests which may occur are set forth in Table 6, in which the first column specifies the user requirement: that is, the requirement causing the imperative request; and the second column sets forth the desired dipole half 62 which will be included in quark 50 of the request 80. In Table 6, desired dipole half is illustrated in the form EUSPN-Y, where Y is the desired quality control value 244 selected from among B, R, J, N, W, X, and EUSPN sets forth those access control 242 values which are acceptable (a "." indicating that the corresponding access control value is not acceptable). Thus, the desired dipole half EU . . . -R for the imperative request "get hold clean" indicates that a quality control value of R is required, and that an access control value of either E or U, but not S or P or N, is acceptable. These imperative requests are described hereafter, and in the Daniell, et al, application, supra. The first eight imperative requests listed in Table 6 relate generally to requests processed on behalf of application programs, while the last four relate generally to requests processed on behalf of utilities.

In Table 7 is set forth the dipole half at paired node 30 assumed by this node 20 for a given current dipole half stored at this node 20 for paired node 20. Thus, E-* N-* signifies that if the current dipole half at this node 20 for paired node 30 has access control equal to E, it will assume that the current dipole half at paired node 30 for this node 20, for the same data atom, has access control equal to N. Similarly, *-B *-W signifies that for a quality control of B in the dipole half at this node 20 for paired node 30, this node 20 will assume that the quality control at paired node 30 for this node 20 is equal to W. As will be further discussed hereafter, the dipole half pairings set forth in Table 7 are used in determining whether or not a response quark is required at step 298 (will a given change to a dipole half at this node result in a change at the paired or referent node).

Referring now to FIGS. 11-17, a description will be given of examples illustrating dynamic replication and asynchronous communication protocols of the invention.

Figure 11:
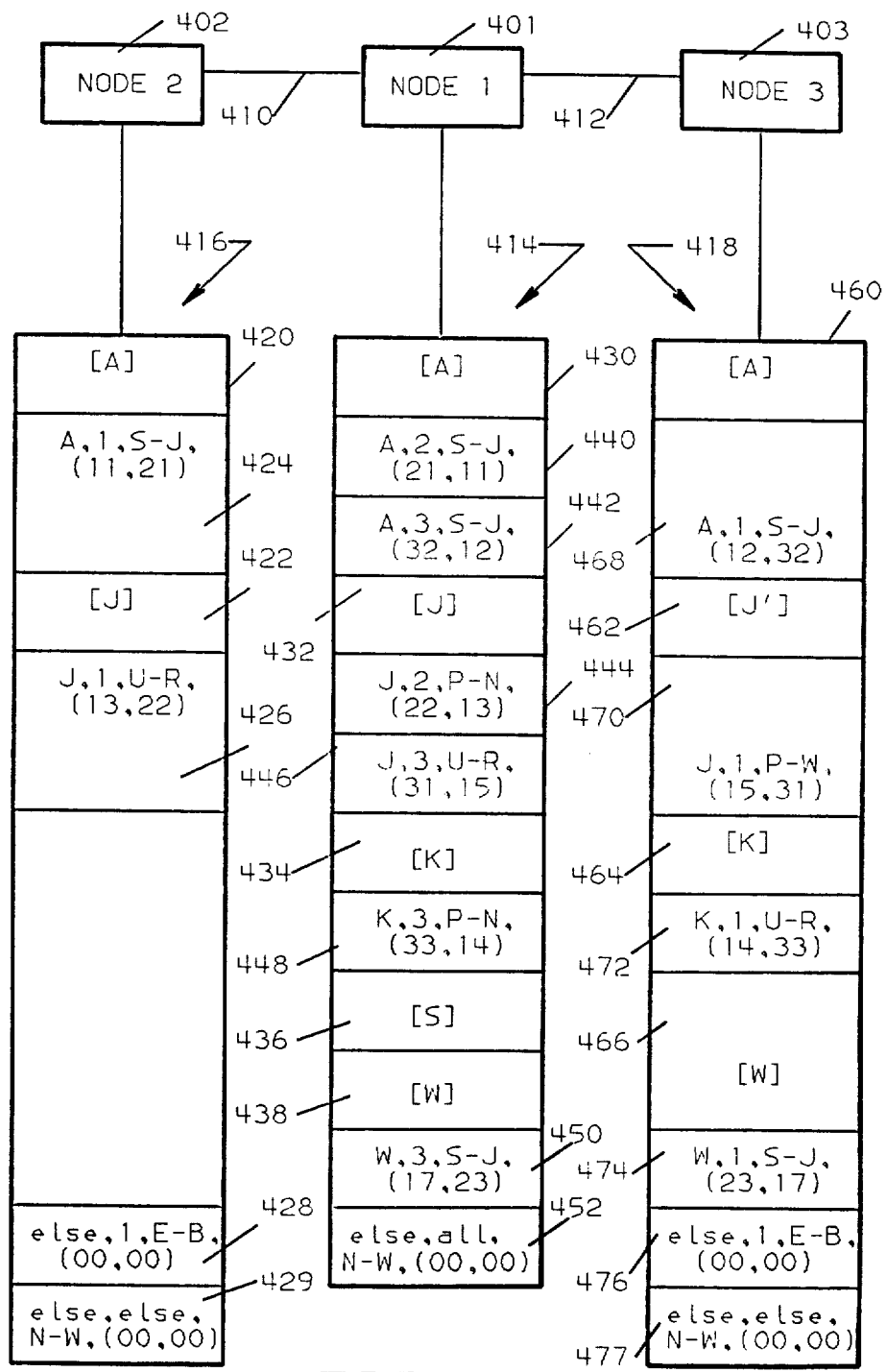
FIG. 11 is a schematic illustration of the initial conditions at three nodes for the examples of FIGS. 12—16.

FIG. 11 sets forth the initial data and control states at each of three nodes 401, 402, and 403. Nodes 401 and 402 are interconnected by a communication link 410, and nodes 401 and 403 by link 412. Node 401 includes within its storage space 414, such as in main storage and on external storage devices, a data file including data atom A 430, J 432, K 434, S 436, and W 438, and a storage access control (SAC) file including entries 440-452. Node 402 includes within its storage space 416 data atoms A 420 and J 422, and SAC file entries 424, 426, and 428. Node 403 includes within its storage space 418 data atoms A 460, J' 462, K 464, and W 466, and SAC file entries 468-476. As illustrated in FIGS. 11-17, a data atom is represented by an apostrophe "'" indicating that the data atom has been updated. An entry in a SAC file is of the form:

key,paired node ID,C-Q,
(PNRANK, TNRANK)

where "C-Q" is the current access control and quality control at his node for the paired node. Thus, entry 440 of A, 2, S-J,
(21,11)
is interpreted as follows:

A: is the key value for data atom A;
2: paired node identifier (node 2, meaning node 402—the first two digits will be dropped in the example SAC file entries for the purpose of this description);
S-J: access control and quality control (C-Q) at this node for the paired node (access control C=S; quality control Q=J);
21: PNRANK;
11: TNRANK.

In the description of FIGS. 11 through 16, references to "dipole halves" may or may not include ranks and data atom key depending on the context.

Default SAC file entries 428, 429, 452, 476, and 477, as previously described, are shown on the last lines of storage devices 414-418 in FIG. 11.

While FIG. 11 illustrates the initial conditions at each node, in each of FIGS. 12-16 the initial conditions of just those data atoms and SAC file entries pertinent to the specific example are repeated. In FIGS. 12-16, the initial conditions are illustrated at the top portion of the address space for each node, and changes to data atoms and SAC file entries resulting from communication and processing of dynamic replication requests are shown below them, with the vertical axis representing time.

Dynamic replication requests, including one or more quarks, are shown in FIGS. 12-16 in the following format:

key, EUSPN-Q, data
C-Q, (QTNRANK,QPNRANK)
Thus, referring to FIG. 12, dynamic replication request 482 of K,EUS-J
E-B,(00,00)
is interpreted as follows:

K: key value for data atom K;

EUS-J: desired dipole half (access control=E or U or S, quality control=J); (No data accompanies) Note, ranks are omitted for desired dipole half in these figures;

E-B: current access control (S) and quality control (B) at node 402 sending the message;

00: QTNRANK;

00: QPNRANK.

The ability to share clean data among nodes is illustrated with data atom A of FIG. 11. Entries 440 and 442 reveal that node 401 understands that both nodes 402 and 403 have copies of data atom A, which each is assuming to be clean. This is shown by the dipole half 440,442 "S-J", indicating that access control=shared clean (S) and quality control=joint (J) is assumed at this node 401 on behalf of paired nodes 402 and 403, respectively. If clean data is shared, then none of the parties involved (herein, nodes 401-403) can modify the data without first getting the other nodes to change their view as represented by the dipole half.

A dipole describes the relationship between two nodes for a data atom, or atom. Each of these nodes may have additional relationships for the same item with other nodes as long as the additional relationships do not conflict. For example, by entry 424 (A,1,S-J), Node 402 is aware that it is sharing clean data A with node 401 but is unaware that node 401 has also shared the data atom with node 403.

An application program at node 2, that requires clean or prior data, can read data atom A 420 without network interactions being required.

Referring yet again to FIG. 11, the situation in which data updates can be taking place is shown for data atom J. Entry 426 (J,1,U-R) at node 402 for data atom J includes dipole half U-R, meaning that node 402 views node 401 as having a unique clean view of data atom J. This tells node 402 that node 401, or some other node related to node 401, may be making updates to data atom J. Thus, node 402 must assume that its replica of data atom J 422 is of prior currency. Update activity cannot be permitted at node 402 unless a change to the dipole with node 401 (field 426) is negotiated.

Node 401 has passed along the unique clean view of data atom J to node 403, and node 403 has already modified data atom J' 462.

An application program at node 402 can read data atom J 422 without network intervention being required only if the application has indicated it is accepting prior data. The data atom J 422 at node 402 must be considered prior since node 401, or a node attached to node 401, may be making updates to data atom J.

Figure 12:
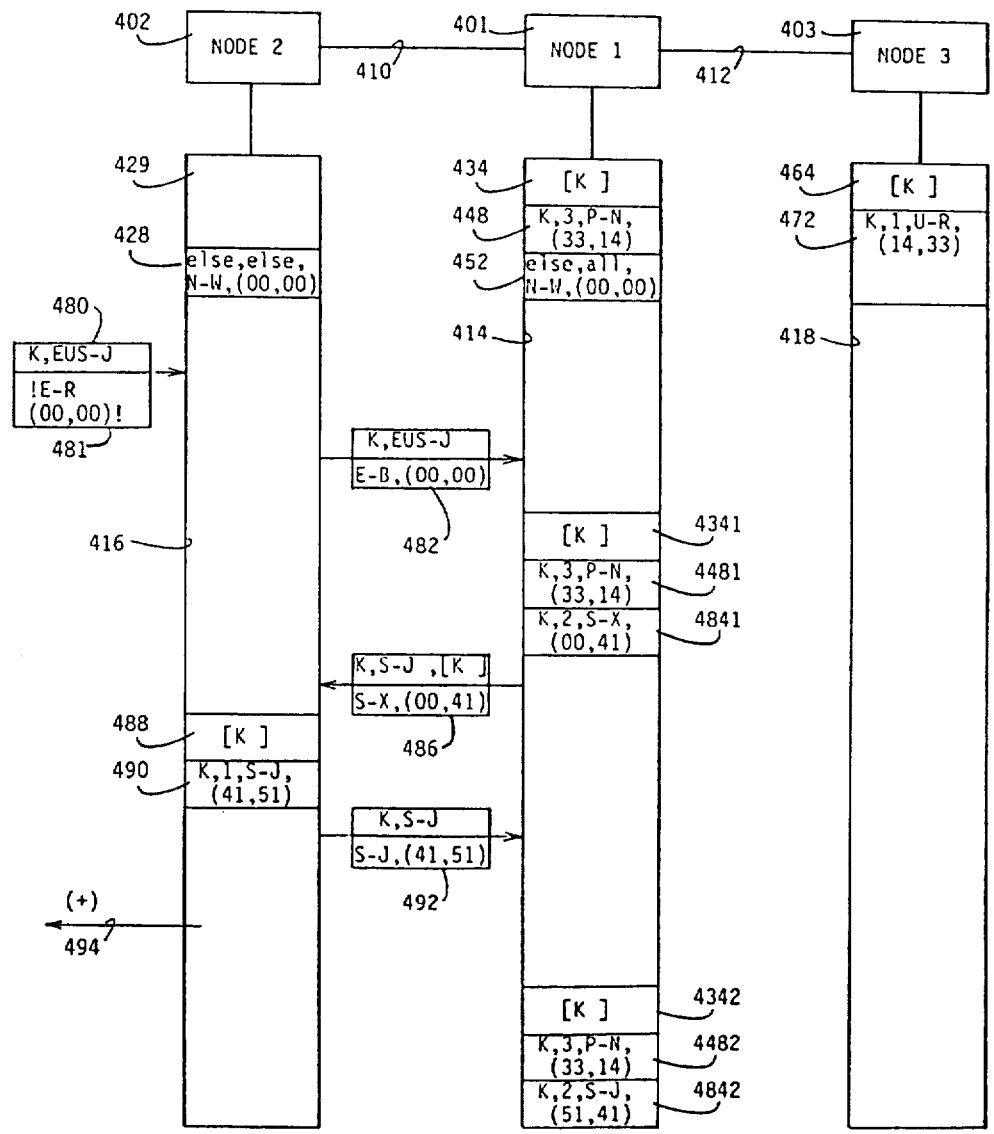
FIG. 12 is a schematic illustration of the process of the invention for obtaining clean data.

Referring now to FIG. 12, a description of the steps of the invention for obtaining clean data will be described. In this case, a retrieval call for a clean copy of data atom K by an application program at node 402 is made. Because node 402 does not initially have a copy of data atom K, processing is required before the application can proceed.

The example in FIG. 12 corresponds to the process illustrated in FIG. 5, in which request quark 120 corresponds to request 480, conflict quark 124 to 482, response quark 154 to 486, response quark 174 to 492, and acknowledgment 136 to 494.

The initial conditions at node 402 are given by entries 428 and 429, the default entries; at node 401 by entries 434, 448 for data atom K and default entry 452; and at node 403 by entries 464, 472 for data atom K. Node 402 does not have a specific dipole half for data atom K with any node. However, the next to last entry 428 in the SAC file portion of file 416 at node 402 indicates that all data items which are not otherwise described (data atom ID=else) are assumed to be held exclusively (access control=E, quality control=B) at node 401 (other node ID=1). The last entry 429 represents a default dipole half N-W (00,00) for all other nodes besides node 1 (401).

A request 480 (K,EUS-J) from Table 6 is built on behalf of the application program requesting "get clean": a request for data atom K with at least shared clean currency (thus, from Table 6, an access control of E or U or S is acceptable and a quality control of J is required). As originally received, message 480 does not include a a current dipole half for a node sending the message. (Field 481 has yet to be filled in). This condition identifies request 480 as an imperative.

With reference to the steps of the method as set forth in FIGS. 10A, 10B, and 18-21, the processing of request 480 (FIG. 12) will be described in detail. Hereafter, in describing the examples of FIGS. 13-16, emphasis will be given to the asynchronous communication protocol aspects, with the changes in dipoles discussed at a higher level.

A. Processing of request 480 at node 2 (402) proceeds as follows:

Step 281: Request 480 is an imperative, inasmuch as, in this case, the request message 80 (480) does not include in its set 92 of quarks 50 the current dipole half 66 at referent node.

Step 283: The assumed dipole half 481 at referent node !E-R,(00,00)! is generated as follows. The stored current dipole half at this node 402 for paired node (else) is given in dipole half 429, as "N-W,(00,00)", which by Table 7 converts to assumed current dipole half at paired node for this node of "E-R,(00,00)". (N in stored dipole 429 becomes E in assumed dipole 481 in the quark (field 66), W becomes R, PNRANK=00 becomes QPNRANK, and TNRANK=00, becomes QTNRANK.)

Step 282: The rank check is satisfied: case 3 of Table 5. A more detailed description of an example of rank check will be given hereafter.

Step 286: Conflict determination is accomplished by reference to FIG. 18, as follows:

Step 630: The desired dipole half EUS-J from request 480 is examined to determine the preferred dipole half. A satisfactory algorithm for chosing the preferred access control is to choose the least stringent value, which would be in the following order of preference: N, P, S, U, E. In this case, S is least stringent, and the preferred dipole half is S-J.

Step 632: The collection of dipole halves created is as follows: preferred dipole half S-J from step 630, request 480; and other dipole halves at this node 402 for data atom K, comprising N-W from field 429 and E-B from field 428.

Step 634: The access control vector derived from the collection created in step 632 is: N=1, P=0, S=1, U=0, E=1.

Step 636: This vector does not match any row in Table 1, consequently a conflict has occurred. (Return to FIG. 10.)

Step 288: Conflict quark 482 is generated with reference to FIG. 19, as follows:

Step 650: The only paired node (for which node 402 has a dipole half 428 for data atom K) is node 1 (401).

Step 652: With reference to Table 8, access control of E, from dipole half 428 for node 1, conflicts with a preferred access control of S in request 480, as determined in step 630.

Step 658: Conflict quark 482 is generated to include desired dipole half 62 EUS-J, where EUS is derived from Table 8 for a preferred access control of S, and J is selected, for this example, from Table 9, which specifies the possible quality control values R, J, N, or X for a desired quality of J in request message 480. (Return to FIG. 10A.)

Step 290: Node 2 (402) waits for node 1 (401) to process conflict quark 482.

B. Processing of request quark 482 at node 1 (401) proceeds as follows: Step 281: This is not an imperative, as the current dipole half at this node 402 is provided in request 482: E-B,(00,00).

Step 282: Rank check is ok: Table 5 case 3.

Step 286: Conflict determination is accomplished by reference to FIG. 18, as follows:

Step 630: The preferred dipole half is S-J, where access control = S is the least stringent of the acceptable set EUS in request 482.

Step 632: The collection of dipole halves for data atom K at node 1 includes preferred dipole half S-J and other dipole halves 452 (N-W) and 448 (P-N).

Step 634: The access control vector for the collection of dipole halves of step 632 is N=1, P=1, S=1, U=0, and E=0.

Step 636: The vector from step 634 matches the third row of Table 1; there is no conflicting access control.

Step 638: The quality control vector for the collection of dipole halves of step 632 is B=0, R=0, J=1, N=1, W=1, and X=0.

Step 640: The vector from step 638 matches the third row of Table 3; there is no conflicting quality control. Return to FIG. 10A.

Step 292: No reflection is required.

Step 293: The new dipole half 4841 at this node for paired node 2 for data atom K is generated with reference to FIG. 20, as follows:

Step 670: The permissible set of access control values at this node 1 for paired node 2, from Table 2 row 5 for access control = E (from request 482, field 66) is NPSUE.

Step 672: Yes, desired access control, from EUS in request 482, with S selected as least stringent, is in the set from step 670.

Step 674: Access control in dipole half 4841 at this node 1 for node 2 is changed from N (dipole half 452) to the desired access control S.

Step 673: Quality control = W in dipole half 452 at this node 1 for node 2, and node 2 is requesting a value of J (from desired dipole half in message 482).

Step 675: Quality control = W in dipole half 452 is changed to X in dipole half 4841.

Step 676: Yes. The rank values in dipole half 452 compare with those in request 482 as required by case 3 of Table 5.

Step 678: PNRANK in dipole half 4841 is set equal to 00, the QPNRANK from message 482.

Step 680: Yes. By reference to FIGS. 22 and 23, both the access control change from N (in dipole half 452) to S (in dipole half 4841) and the quality control change from W (in 452) to X (in 4841) are significant events.

Step 682: Assuming that the current value of the rank generator is 41, it is copied into TNRANK in dipole half 4841. Return to FIG. 10B.

Step 294: Response 486 is generated as follows, with reference to FIG. 294:

Step 690: Current dipole 4841 S-X,(00,41) is copied into response quark 486.

Step 692: The preferred dipole half access control value selected from request 482 is S (step 630). By reference to Table 10, for a preferred access control value of S, the desired access control value for the dipole half in response quark 486 is also S.

Step 694: The desired quality control value from request message 482 is J, and the preferred access control value selected in step 630 is S. From Table 11, therefore, the quality control value for the desired dipole half in response 486 is J. The desired dipole half is S-J. Return to FIG. 10B.

Step 296: Response 486 will cause a change of dipole half at node 2 inasmuch as the desired dipole half S-J in response quark 486 differs from the current dipole half E-B in request quark 482.

Step 298: Send response quark 486 to node 2.

Step 300: Acknowledgement is not required.

C. Processing of request quark 486 at node 2.

(Step 290: Wait continues, no acknowledgement having been received as yet.)

Step 280: The request quark is response quark

Step 281: No.

Step 282: QPNRANK=41 and QTNRANK=00 from quark 486. PNRANK=00 and TNRANK=00 at this node 2 for node 1 is 00 (dipole half 428). These values satisfy the third row of Table 5, and suggest normal processing.

Step 286: There is no conflict, as is determined from FIG. 18, as follows:

Step 630: Preferred dipole half from the desired dipole half S-J in quark 486 is S-J.

Step 632: The collection of dipole halves for data atom K at node 2 includes preferred dipole half S-J and other dipole half N-W (429). Dipole half 428 is not included as it is for the node 1, the referent node of the preferred dipole half.

Step 634: The access control vector for the dipole halves of the step 632 collection is N=1, P=0, S=1, U=0, and E=0.

Step 636: The access control vector matches the third row of Table 1.

Step 638: The quality control vector for the dipole halves of the step 632 collection is B=0, R=0, J=1, N=0, W=1, and X=0.

Step 640: Yes. The quality control vector matches the third row of Table 3. There is no conflict. Return to FIG. 10B.

Step 292: Reflection is not required.

Step 293: The new dipole half 490 at this node 2 is generated, with reference to FIG. 293, as follows:

Step 670: From Table 2, the set of permissible access control values at this node 2 for an access control value of S paired node 1 (from quark 486) is SUE.

Step 672: Yes. The desired access control (from quark 486) of S is in the set SUE.

Step 674: Access control = E in dipole half 428 is changed to S in dipole half 490.

Step 673: No. The current quality control in dipole half 428 is B, and J is desired (quark 486).

Step 677: From Table 4, the set of permissible quality control values at this node 2 is BRJN for a quality control value of X at paired node 1 (from quark 486).

Step 679: Yes. J is in the set BRJN.

Step 681: Quality control=B in dipole half 428 is changed to J in dipole half 490.

Step 676: Yes. QPNRANK is 41 and QTNRANK is 00 in quark 486. PNRANK is 00 and TNRANK is 00 from dipole half 428 at this node 2 for node 1 for data atom K. Table 5 case 3 is satisfied.

Step 678: PNRANK in dipole half 490 is set to QPNRANK=41.

Step 680: Yes. From FIG. 23, a change in quality control from B to J is a significant event. (The change from access control=E to=S is not.)

Step 682: The rank generator value at node 2, assumed to be 51, is copied into TNRANK in dipole half 490. Return to FIG. 10B.

Step 294: With reference to FIG. 21, response quark 492 is generated as follows:

Step 690: Current dipole half 490 S-J,(41,51) is copied into quark 492.

Step 692: The preferred access control from request 486 is S. From Table 10, the desired dipole half access control for response quark 492 is S.

Step 694: The desired quality control from request quark 486 is J, and the preferred access control is S. From Table 11, the desired dipole half quality control for response quark 492 is J. Return to FIG. 10B.

Step 296: Yes. The desired dipole half S-J in response quark 492 is different from the current dipole half S-X in request quark 486.

Step 298: Send response quark 492 to node 1.

Step 300: Yes. Because a destination node reflection ID (not shown) was provided in request quark 486, acknowledgement is required.

Step 302: Send acknowledgment.

D. Processing at Node 2 (Con't.)

Step 290: Acknowledgement satisfies wait 290, and execution continues at step 282, continuing down to step 302, which will return an acknowledgement 494 equivalent to 136 (FIG. 5) to the application issuing the original data call 118 (480).

E. Processing at Node 1

Step 280: Request quark 492.

Step 281: No.

Step 282: Yes. QPNRANK=51 and QTNRANK=41 from request quark 492. PNRANK=00 and TNRANK=41 from dipole half 4841 at this node 1 for paired node 2. These values satisfy case 3 of Table 5.

Step 286: There is no conflict, as is determined from FIG. 18, as follows:

Step 630: Preferred dipole half from request quark 492 is the desired dipole half S-J.

Step 632: The collection of dipole halves includes preferred dipole half S-J and other dipole halves 4481 P-N and 452 N-W.

Step 634: The access control vector for the collection of dipole halves from step 632 is N=1, P=1, S=1, U=0, and E=0.

Step 636: Yes. The access control vector matches the third row of Table 1.

Step 638: The quality control vector for the collection of dipole halves from step 632 is B=0, R=0, J=1, N=1, W=1, and X=0.

Step 640: Yes. The quality control vector matches the third row of Table 3. There is no conflict. Return to FIG. 10B.

Step 292: No reflection is required.

Step 293: The new dipole half 4842 at node 1 for node 2 for data atom K is generated as follows, with reference to FIG. 20:

Step 670: The set of possible access control values at this node 1 for paired node 2, for an access control value of S at paired node 2 for node 1 (from request quark 492), from Table 2 is SUE.

Step 672: Yes, the desired access control=S from request quark 492 is in the set SUE.

Step 673: No. Quality control of dipole half 4841 is X, not W.

Step 677: From Table 4, the set of permissible quality control values at this node 1 for a quality control=J at paired node 2 (from request quark 492) is JNWX.

Step 679: Yes. Desired quality control=J from request quark 492 is in the set JNWX.

Step 681: Change quality control=X in dipole half 4841 to J in dipole half 4842.

Step 676: Yes. QPNRANK=51 and QTNRANK=41 from quark 492. PNRANK=00 and TNRANK=41 from dipole half 4841. These values satisfy case 3 of Table 5.

Step 678: PNRANK in dipole half 4842 is set equal to QPNRANK=51 from quark 492.

Step 680: No. There is no change in access control (S in dipole half 4841 remains S in dipole half 4842). The change in quality control from X to J is not, by reference to FIG. 23, significant. TNRANK remains 41 in dipole half 4842.

This completes the explanation of FIG. 12.

Figure 13A:
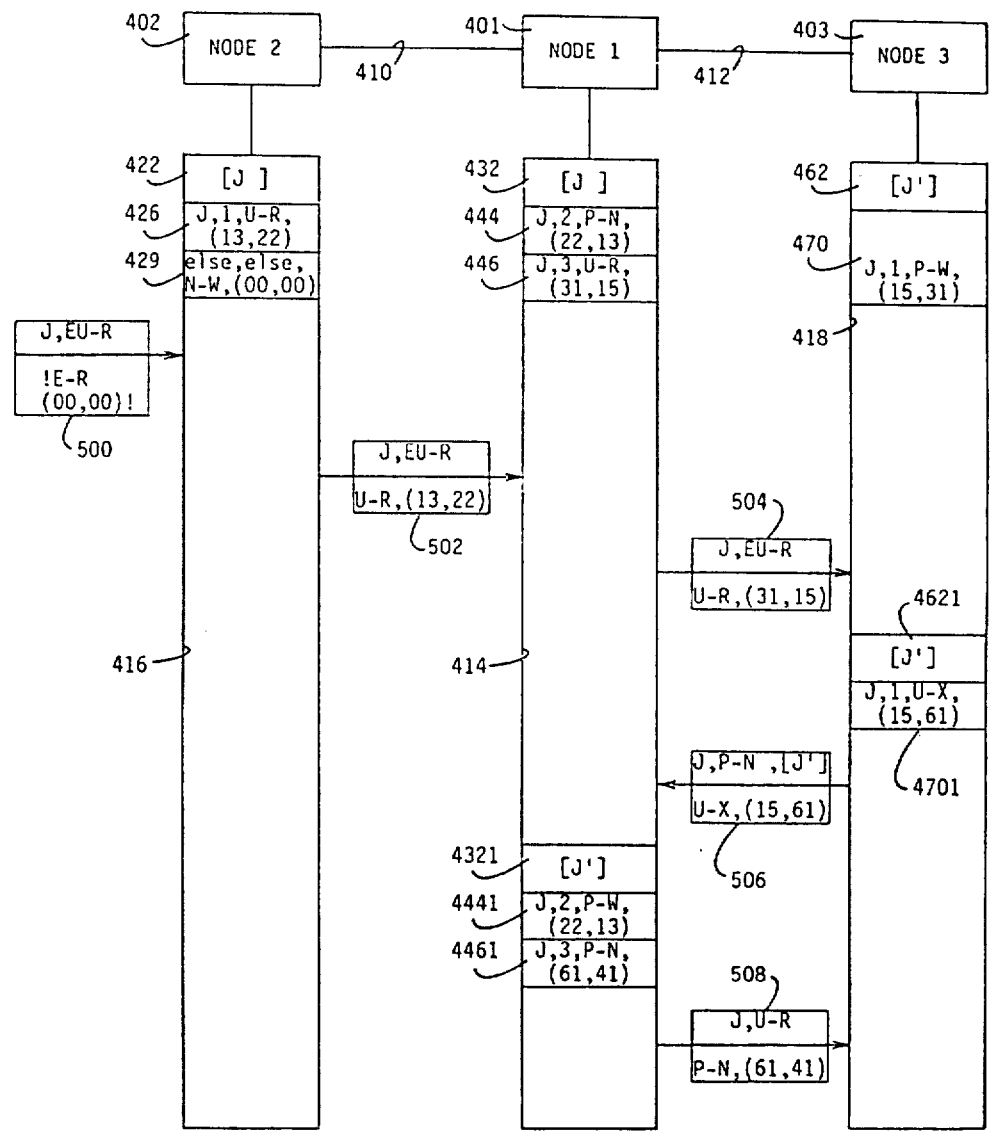
FIGS. 13A and 13B are a schematic illustration of the process of the invention for retrieving data with the intent to update, where conflicts exist.
Figure 13B:
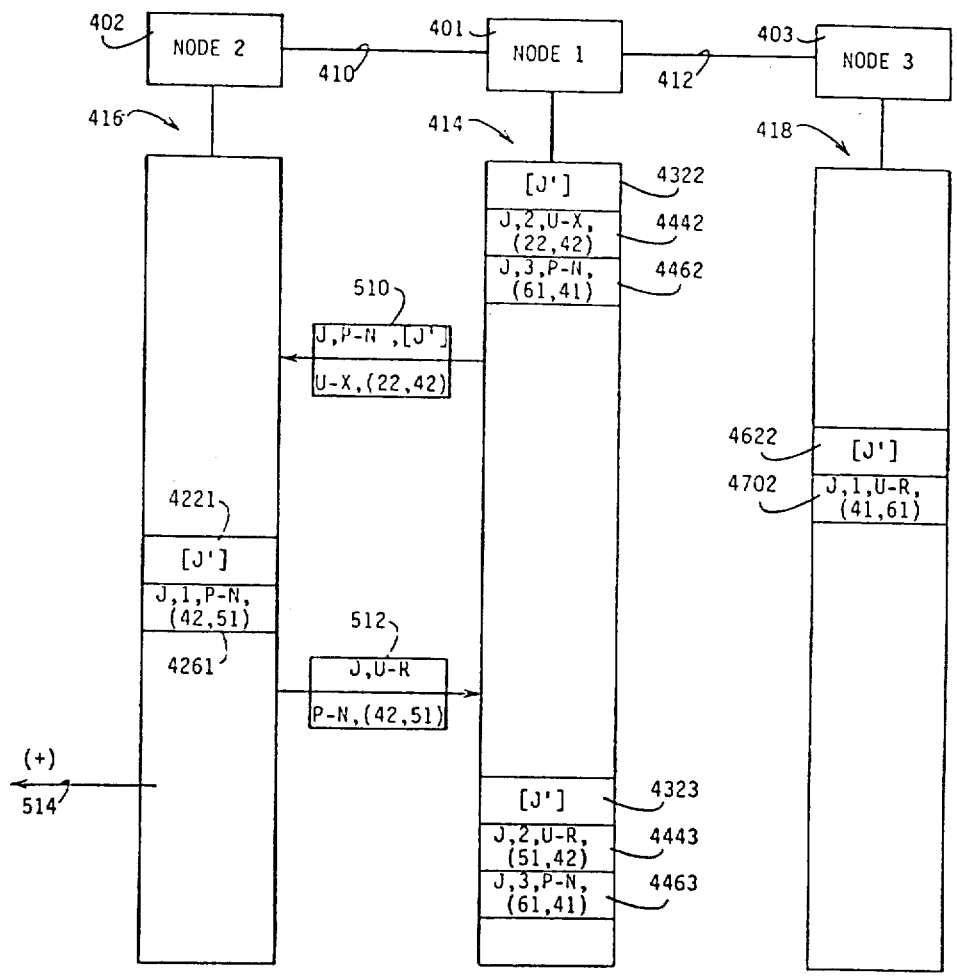

Referring now to FIGS. 13A and 13B, an explanation will be given the process for retrieval with intent to update under conditions of existing conflicts.

Request quark 500 represents a retrieval call from an application program at node 2 for data atom J with intent to modify the data atom.

A copy 422 of data atom J is already held at node 2, but the dipole half 426 indicates that node 1 or some node related to node 1 may be making changes to data atom J.

Request 502 is made by node 2 to node 1. Since the application has specified an intent to modify the data atom J, a unique clean currency EU is requested. The RANK values (13,22) in quark 502 are copied from dipole half 426 at node 2.

Node 3 has the unique clean view of data atom J. This conflicts with the request 502 EU-R from node 2. In conflict quark 504, node 1 requests node 3 to surrender the unique clean view of data atom J. Node 3 can retain its replica 4621 at an assumed currency of prior.

Node 3 surrenders its view as required in establishing dipole half 4701 and sending response quark 506 back to node 1. This action may have to wait for the completion of an application program running at node 3 if the application program is positioned on data atom J, has locked it, or is modifying it.

Node 3 eventually gives a positive response to the request from node 1 in response 506. The response acknowledges that node 3 is now assuming its copy of data atom J is prior. Since at least one change to data atom J has been performed at node 3, the most recent value of the data atom is sent with the reply.

Node 1 saves the new value J' in its data file at 4321, and records the node 3 dipole half change in its SAC file at 4461, indicating that node 2 now has worse data (reflection step 292), since a new data value J' was received from node 3.

Node 1 sends response 508 to node 3, acknowledging the receipt of the new data value J' and responsibility.

Node 1 resumes processing of the original request 502 from node 2, and, since no conflicting dipole half now exists, grants the request by recording the new dipole half for node 2 in its SAC file at 4442.

Node 1 sends a positive response 510 to the original node 2 request 502 along with a new copy of data atom J. This response 510 acknowledges that node 1 (and all other nodes related to node 1) is now assuming its copy 4322 of data atom J to be prior.

In the meantime, node 3 receives the acknowledgment 508 from node 1, and changes the node 1 dipole half 4702 to indicate that the new data value was successfully received by node 1. There is no need to generate a response to node 1 because node 1's dipole half 4462 is already the same as what would be requested in the response.

Node 2 replaces its copy of data atom J 4221 in its data file and records the node 1 dipole half change 4261 in its SAC file 416.

Node 2 acknowledges the receipt of the new data value and responsibility by sending a reply 512 to node 1.

Since the original conflict is resolved, acknowledgment 514 indicates that the application program request 500 can now be passed on to the data base manager.

Node 1 receives acknowledgement 512 from node 2, and changes the node 1 dipole half 4443 to indicate that the new data value was successfully received by node 2.

Figure 14:
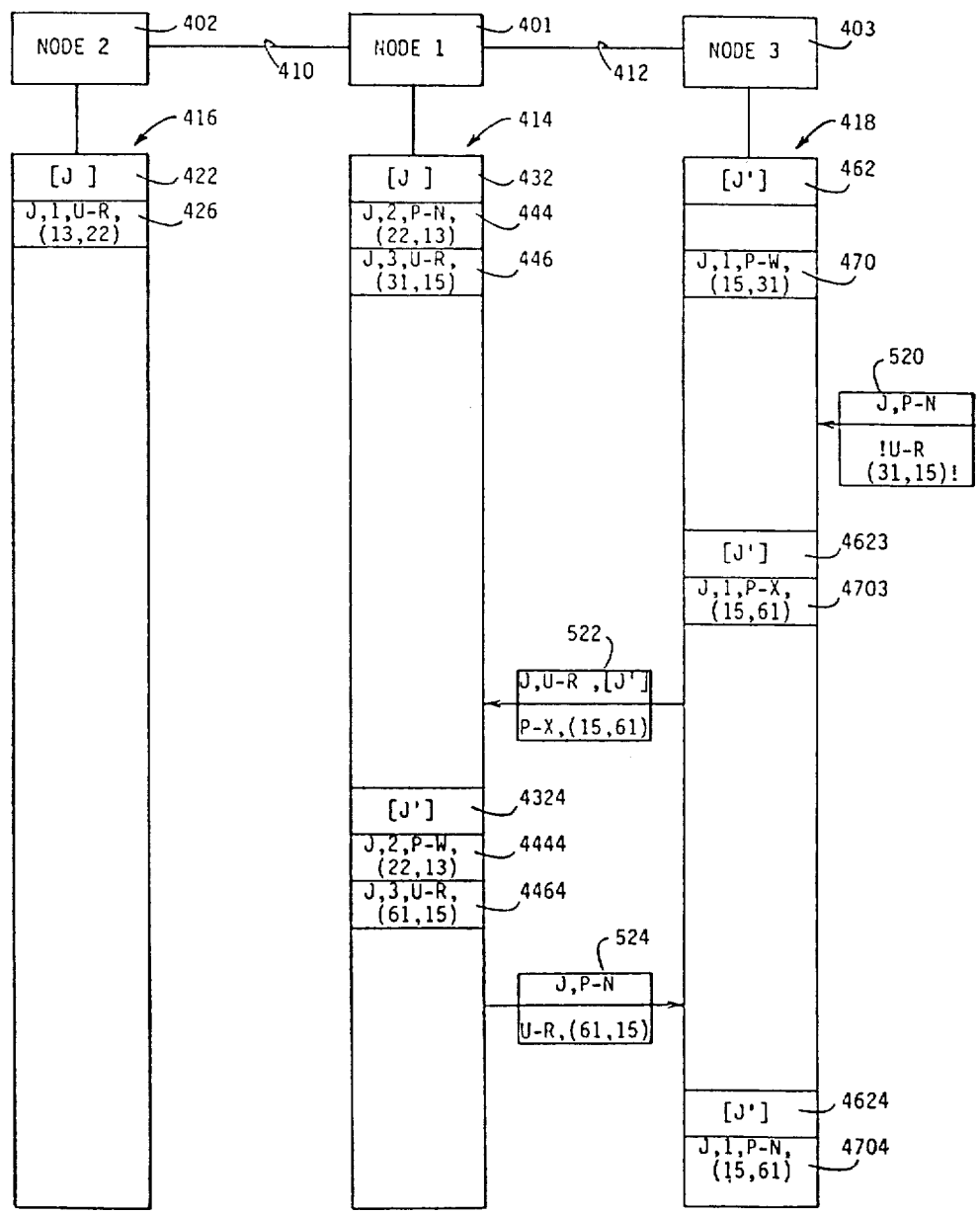
FIG. 14 is a schematic illustration of the process of the invention for update conformance.

Referring now to FIG. 14, a description of the invention for update conformation will be described.

When a data base update is made at one node, this update may need to be reflected at other nodes in the network. This process is called conformation, since the network-wide data base is made to conform to an update made at one location. Each node ensures that conflicting dipole halves never exist in the network, data base integrity is not affected by when, or even if, conformation occurs. Performance and availability, however, are affected by the scheduling of conformation.

Conformation can be initiated in several ways: (1) When the responsibility for a data atom is given up by a node, any modifications to the data atom made by the node must be conformed at that time. This may occur in response to a request from another node or because space in the data or SAC file 414 is needed for some other data atom. (2) Conformation can result from the initiation of the conformation transaction. The conformation transaction can be initiated via any mechanism available for scheduling application transactions at the replica node: time-of-day, time interval, operator command, work to be done, etc.

The first step of conformation is to transmit the modified data to one or more nodes related to this node for the data atom. The data files at the related nodes are made to reflect the change. Each of the related nodes can in turn conform the updates to still other nodes with which they are related.

Referring now to FIG. 14, node 2 and node 1 have copies 422 and 432 of data atom J which do not reflect an update made at node 3 (J' 462). The conformation transaction generates dynamic replication request 520, which is formulated as though it came from node 1. Node 3 changes the node 1 dipole half 4703 to reflect that node 1 now is receiving better data. A request 522 is made by node 3 to node 1 to accept a new copy of data atom J. Node 1 inserts the new copy 4324 into its data file 414, and reflects in dipole half 4444 that the node 2 copy of data atom J now is of worse quality. Acknowledgment 524 is sent back to node 3, indicating that node 1 successfully received the new copy for data atom J. Node 3 changes the done 1 dipole half 4704 to reflect that no data quality difference is known to exist between the nodes.

Figure 15:
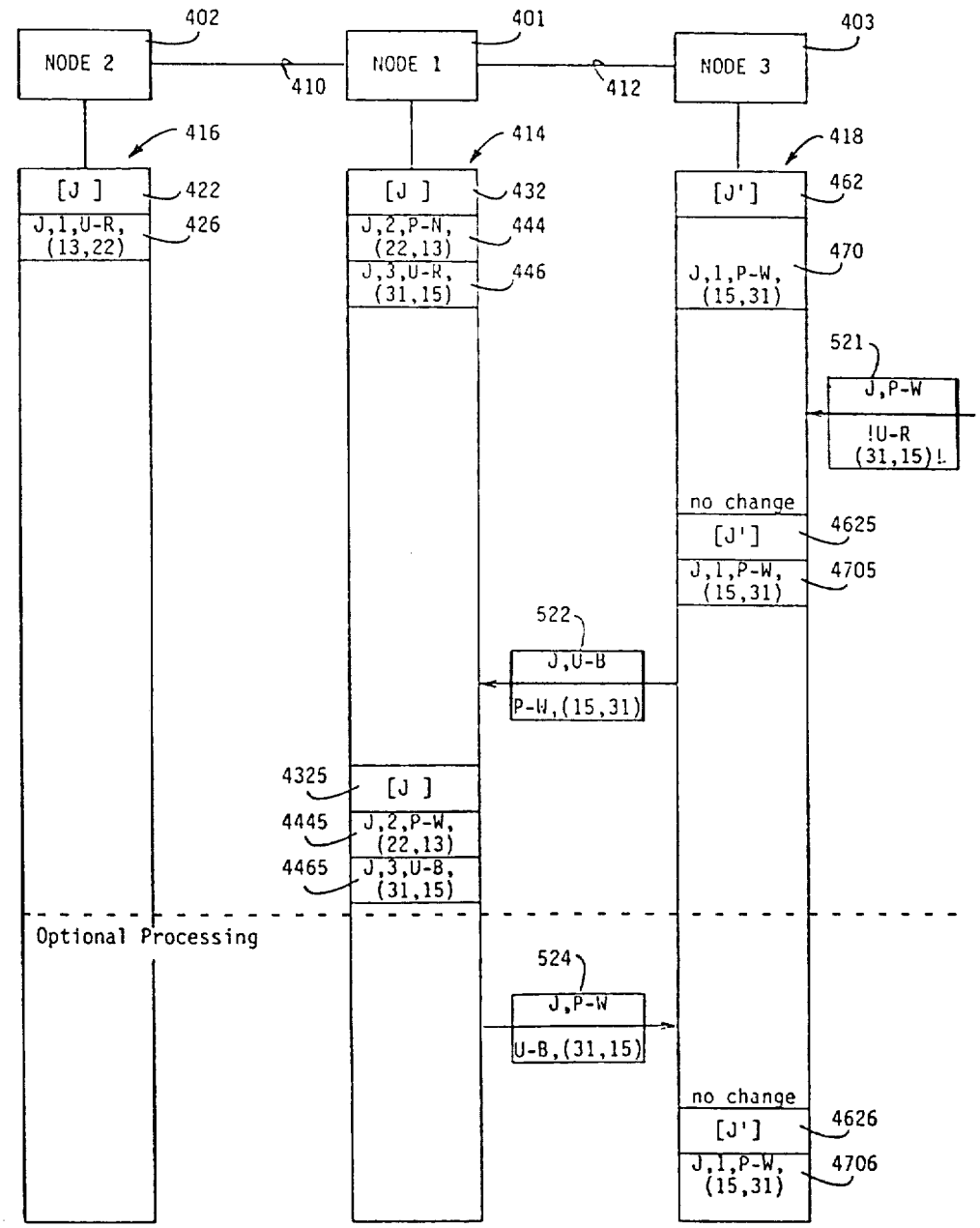
FIG. 15 is a schematic illustration of the process of the invention for update advice.

Referring to FIG. 15, when a data base update is made at one node, knowledge of this update may need to be provided to other nodes in the network. This process is called "advice". The advice process is primarily useful for providing nodes that support applications requesting prior currency with information on the quality of their stored copies. Advice can be initiated in several ways: (1) When a node receives knowledge of a significant data quality change, either from another node or as a result of local processing, advice may be given to related nodes about that change. (2) Advice can also result from the initiation of an advice transaction similar to the conformation transaction as previously described. Each of the related nodes can in turn send advice of the change to still other nodes with which they are related.

In FIG. 15, nodes 2 and 1 have copies 422 and 432 of data atom J which do not reflect an update made at node 3. The advice transaction generates a dynamic replication request 521, which is formulated as though it came from node 1. There is no change of the dipole half for node 1 at node 3. A message 522 is sent by node 3 to node 1 indicating that node 3 has better data for data atom J. In dipole halves 4445 and 4465, node 1 indicates that the node 2 copy of data atom J now is of worse quality, and that node 3 has better quality data for data atom J. If node 3 so has requested, an acknowledgement is sent back to node 3, indicating that the node 1 is advised of the data quality difference between the nodes for data atom J. This acknowledgment is not part of the integrity management protocols, but rather is a manifestation of conformation and advice rules. Node 3 may use the acknowledgment to indicate that node 1 is advised of the data quality difference between the nodes. No change, however, is made to the related dipole half 4706.

Figure 16:
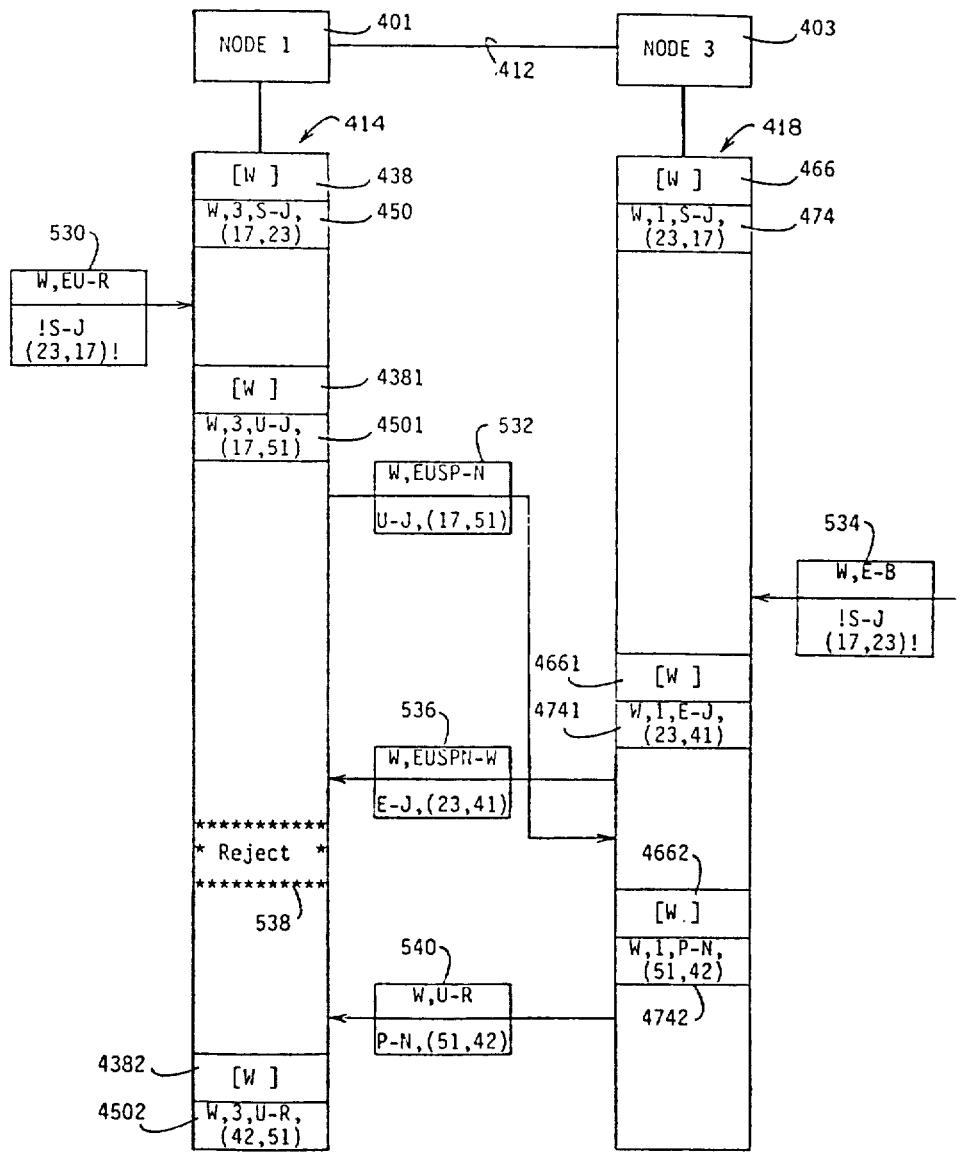
FIG. 16 is a schematic illustration of the process of the invention for processing "ships that pass in the night".
Figure 17:
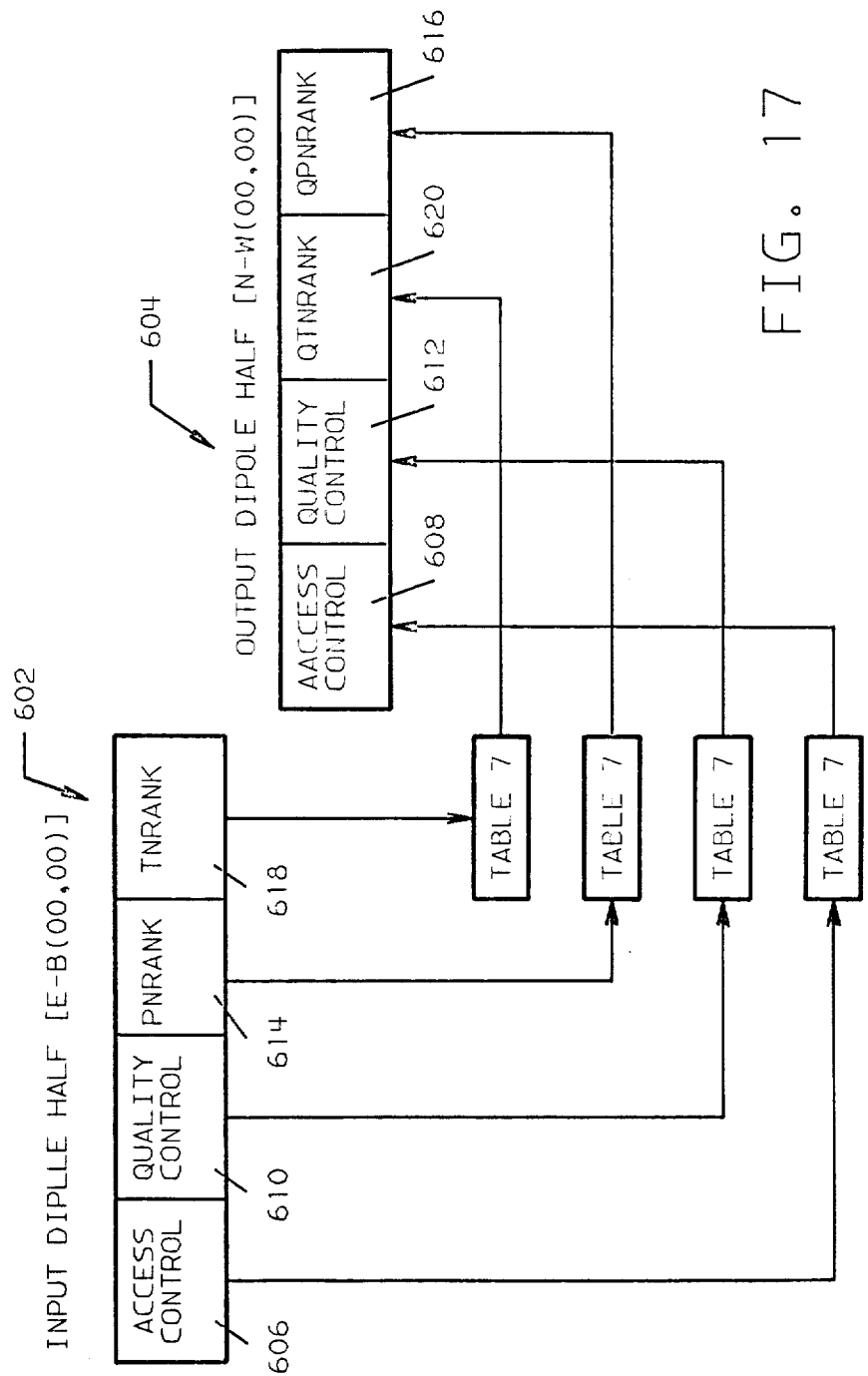
FIG. 17 is a diagrammatic illustration of the use of Table 7 in generating from an input dipole half an assumed dipole half for an imperative for which a dipole half is not provided.

Referring now to FIG. 16, a description is given of "ships that pass in the night". Here, two nodes 1 and 3 at the same time send messages to each other, causing the messages to pass each other as "ships in the night". Node 1 and node 3 both hold a copy 438, 466 of data atom W with clean currency 450, 474. An operator facility at node 1 issues request 530 to surrender its clean currency of data atom W. Node 1 changes its dipole half 4501 for node 3 to reflect that node 3 now has unique clean currency for data atom W. Request 532 is sent to node 3 indicating that node 1 is prepared to accept its view of data atom W as being of prior currency, and that node 3 is requested to assume sole responsibility for the data atom. At node 3, a similar process occurs 534, causing a request 536 to be generated for node 3 to surrender its copy of data atom W, and to request node 1 to take sole responsibility for the data atom. Node 3 changes its dipole half 4741 for node 1 to reflect that node 1 now has exclusive currency for data atom W. The responsibility remains joint, since a node cannot unilaterally give up responsibility. Request 536 is sent by node 3 to node 1 to accept exclusive currency and sole responsibility. Node 1 rejects 538 processing of the request since the QTNRANK=23 value is less than the stored TNRANK=51 in dipole half 4501, and node 3 is not for data atom W. (Node 1 has SHIP=NO for node 3.) Subsequently, message 532, previously sent by node 1 to node 3, arrives at node 3. Node 3 discovers that QTNRANK=17 in quark 532 is less than TNRANK=41 from dipole half 4741, but accepts request 532 for processing since node 3 has SHIP=YES for node 1. Node 1 dipole half 4742 is changed to reflect that the node 1 copy 4381 is of prior currency. Node 3 sends message 540 to node 1 indicating that node 3 now has accepted sole responsibility for data atom W. Node 1 changes its dipole half 4502 for node 3 to indicate that node 3 now has sole responsibility for data atom W.

Figure 24:
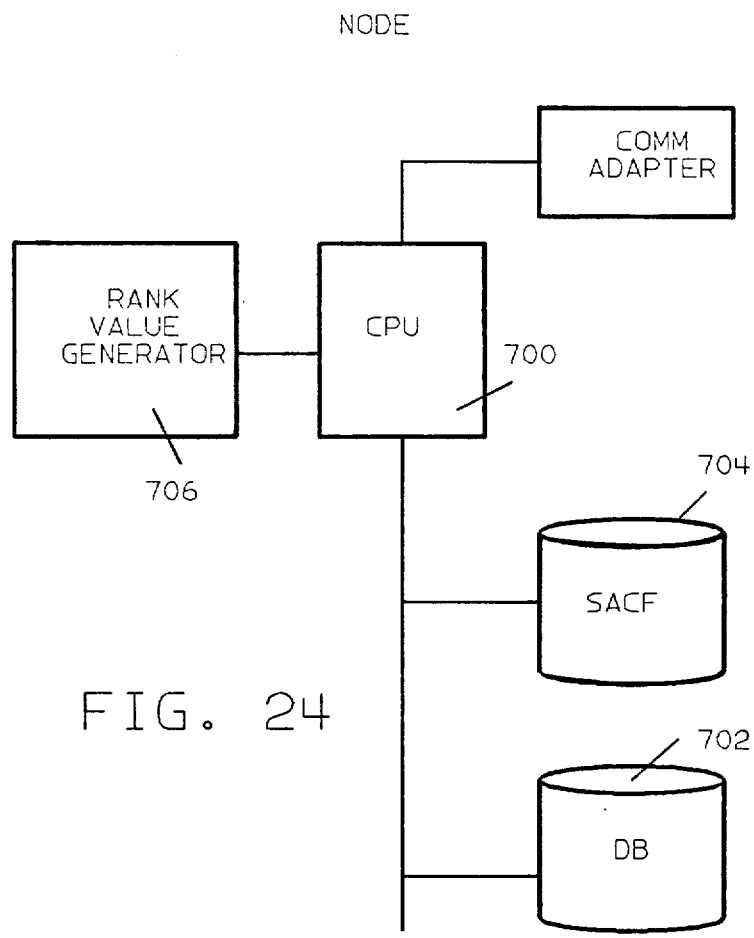
FIG. 24 is a diagrammable illustration of a typical node.

Referring to FIG. 24, a typical mode includes a central processing unit 700. Data base 702 stores one or more data atoms. Status and control file 702 stores one or more dipole halves 240, with a dipole half 240 for each node with which this node shares a data atom, together with certain default dipole halves. Rank value generator 706 generates rank values, as previously described, for storage in dipole halves in SAC file 704.

TABLE 1

ACCESS CONTROL VECTOR VALIDITY

| N | P | S | U | E |
|---|---|---|---|---|
| >=0 | 0 | 0 | 0 | 1 |
| >=0 | >=0 | 0 | 1 | 0 |
| >=0 | >=0 | >=1 | 0 | 0 |
| >=0 | >=1 | 0 | 0 | 0 |
| >=0 | 0 | 0 | 0 | 0 |

TABLE 2

| | | This Node Dipole Half | | | | |
|---|---|---|---|---|---|---|
| | | N | P | S | U | E |
| Paired | N | invalid | invalid | invalid | invalid | ok |
| Node | P | invalid | invalid | invalid | ok | ok |
| Dipole | S | invalid | invalid | ok | ok | ok |
| Half | U | invalid | ok | ok | ok | ok |
| | E | ok | ok | ok | ok | ok |

TABLE 3

| B (BY) | R (NY) | J (NB) | N (NN) | W (WN) | X (XN) |
|---|---|---|---|---|---|
| 1 | 0 | 0 | 0 | >=0 | 0 |
| 0 | >=1 | >=0 | >=0 | >=0 | >=0 |
| 0 | 0 | >=0 | >=0 | >=0 | >=0 |

TABLE 4

| | | This Node Dipole Half | | | | | |
|---|---|---|---|---|---|---|---|
| | | B | R | J | N | W | X |
| Paired | B | invalid | invalid | invalid | ok | ok | ok |
| Node | R | invalid | invalid | invalid | ok | ok | ok |
| Dipole | J | invalid | invalid | ok | ok | ok | ok |
| Half | N | ok | ok | ok | ok | ok | ok |
| | W | ok | ok | ok | ok | ok | ok |
| | X | ok | ok | ok | ok | ok | ok |

TABLE 5

| | Col. 1 QPNRANK vs PNRANK | Col. 2 QTNRANK vs TNRANK | Col. 3 PNRANK := QPNRANK | Col. 4 PROCESS |
|---|---|---|---|---|
| Case 1 | QPNRANK < PNRANK | any | No | Reject |
| Case 2 | QPNRANK = PNRANK | QTNRANK < TNRANK | No | Reject |
| Case 3 | QPNRANK = PNRANK | QTNRANK = QTNRANK | Yes | Normal |
| Case 4 | QPNRANK >= PNRANK QPNRANK >= PNRANK | QTNRANK = TNRANK QTNRANK > TNRANK | Can never happen | Can never happen |
| Case 5 | QPNRANK > PNRANK | QTNRANK < TNRANK | Rule | Rule |

TABLE 6

| User Requirement | Desired Dipole Half |
|---|---|
| get prior | EUSP.-N |
| get clean | EUS...-J |
| get hold clean | EU...-R |
| delete | EU...-R |
| replace | EU...-R |
| insert | EU...-R |
| update commit | .U...-B |
| conform | ...P.-N |
| advise | ...P.-W |
| ship data anyway | ...P.-X |
| expunge data | E....-B |

TABLE 7

| STORED Current Dipole Half at This Node for Paired Node | ASSUMED Current Dipole Half at Paired Node for This Node |
|---|---|
| E-* | N-* |
| U-* | P-* |
| S-* | S-* |
| P-* | U-* |
| N-* | E-* |
| *-B | *-W |
| *-R | *-N |
| *-J | *-J |
| *-N | *-R |
| *-W | *-R |
| *-X | *-B |
| PNRANK | QPNRANK |
| TNRANK | QTNRANK |

TABLE 8

| Col. 1 PREFERRED ACCESS | Col. 2 CONFLICTING ACCESS | Col. 3 CONFLICT QUARK |
|---|---|---|
| N | — | E U S P N |
| P | E | E U S P |
| S | E U | E U S |
| U | E U S | E U |
| E | E U S P | E |

TABLE 9

| Col. 1 DESIRED QUALITY | Col. 2 CONFLICT QUALITY | Col. 3 CONFLICT QUARK |
|---|---|---|
| B | B | B X |
| R | B | R J N N |
| J | B | R J N X |
| N | B | R J N X |
| W | — | R J N X |
| X | B | R J N X |

TABLE 10

| Col. 1 PREFERRED ACCESS | Col. 2 DESIRED DIPOLE ½ |
|---|---|
| N | E |
| P | U |
| S | S |
| U | P |
| E | N |

TABLE 11

| Col. 1 DESIRED QUALITY | Col. 2 PREFERRED ACCESS | Col. 3 DESIRED DIPOLE ½ |
|---|---|---|
| B | Any | W |
| R | Any | N |
| J | Any | J |
| N | Any | R |
| W | Any | B |
| X | N | R |
|   | P | R |
|   | S | J |
|   | U | N |
|   | E | N |

TABLE 12

```
/*                                                                  */00001000
/*                                                                  */00002000
/*          CALL RANKS — PERFORMS THE RANKS ALGORITHM.              */00003000
/*                                                                  */00004000
/*                                                                  */00005000
/*                                                                  */00006000
/*     INPUT: A REQUEST QUARK AND A DIPOLE HALF                     */00007000
/*                                                                  */00008000
/*          INQ — POINTER TO REQUEST QUARK                          */00009000
/*          IND — POINTER TO DIPOLE HALF FOR REFERENT NODE          */00010000
/*          QUCPNRNK — PAIRED NODE RANK IN A QUARK                  */00011000
/*          QUCTNRNK — THIS NODE RANK IN A QUARK                    */00012000
/*          DICPNRNK — PAIRED NODE RANK IN A DIPOLE HALF            */00013000
/*          DICTNRNK — THIS NODE RANK IN A DIPOLE HALF              */00014000
/*          SHIPS — INDICATES IF THIS NODE WINS TIES                */00015000
/*                                                                  */00016000
/*     RETURN CODES:   0 — NO INCIDENTS OR ERRORS                   */00017000
/*                     4 — SYNC INCIDENT, NULLIFY QUARK             */00018000
/*                       (NO NEED TO PROCESS)                       */00019000
/*                     6 — NONCE ERROR (UNEXPECTED INPUT)           */00020000
/*                     8 — SYNC INCIDENT, INVALIDATE QUARK          */00021000
/*                       (MAY NOT BE PROCESSED)                     */00022000
/*                    16 — ALGORITHM FAILED UNEXPECTEDLY            */00023000
/*                                                                  */00024000
/*                                                                  */00025000
RANKS: PROC;                                                          00026000
DCL RNKRI BIN(8);           /*RANKS WORKING RETURN CODE*/             00027000
/*                                                                  */00028000
/* CHECK THE RANKS AND SET AN INDICATOR TO DIRECT PROCESSING         */00029000
/*                                                                  */00030000
SELECT;                     /*COMPARE RANKS IN QUARK FROM R.N. WITH   00031000
                              THOSE IN DIPOLE HALF AT T.N. FOR R.N.*/ 00032000
    WHEN(INQ->QUCPNRNK  <  IND->DICPNRNK)     /*CASE 1:               00033000
                              THE CURRENT MESSAGE HAS ARRIVED AT      00034000
                              THIS NODE OUT OF ORDER. REJECT IT.*/    00035000
        RNKRI=4;            /*REPORT SYNC INCIDENT*/                  00036000
    WHEN( (INQ->QUCPNRNK  =  IND->DICPNRNK) &                         00037000
          (INQ->QUCTNRNK  <  IND->DICTNRNK) )   /*CASE 2:             00038000
                              THE REFERENT NODE HAS NOT RECEIVED      00039000
                              THIS NODE'S MOST RECENT MESSAGE.        00040000
                              REJECT IT*/                             00041000
        RNKRI=8;            /*REPORT SYNC INCIDENT*/                  00042000
    WHEN( (INQ->QUCPNRNK  >=  IND->DICPNRNK) &                        00043000
          (INQ->QUCTNRNK  =  IND->DICTNRNK) )   /*CASE 3:             00044000
                              ALL SIGNIFICANT MESSAGES HAVE BEEN      00045000
                              PROCESSED AT BOTH NODES.                00046000
                              PROCESS THIS ONE*/                      00047000
        RNKRI=0;            /*INDICATE RANKS OK*/                     00048000
    WHEN( (INQ->QUCPNRNK  >=  IND->DICPNRNK) &                        00049000
          (INQ->QUCTNRNK  >  IND->DICTNRNK) )   /*CASE 4:             00050000
                              NONCE ERROR - REDUCTION OF RANKS        00051000
                              IS NOT SUPPORTED*/                      00052000
        RNKRI=6;            /*ERROR*/                                 00053000
    WHEN( (INQ->QUCPNRNK  >  IND->DICPNRNK) &                         00054000
          (INQ->QUCTNRNK  <  IND->DICTNRNK) ) DO;  /*CASE 5:          00055000
                              SIGNIFICANT MESSAGES HAVE PASSED        00056000
                              EACH OTHER LIKE SHIPS IN THE NITE.      00057000
                              USE "SHIPS" FIELD TO BREAK TIE*/        00058000
        IF SHIPS                                                      00059000
        THEN                /*T.N. WINS THE TIE*/                     00060000
            RNKRI=0;        /*RANKS OK*/                              00061000
        ELSE                /*R.N. WINS THE TIE*/                     00062000
            RNKRI=8;        /*REPORT SYNC INCIDENT*/                  00063000
    END;                    /*END CASE 5*/                            00064000
    OTHERWISE RNKRI=16;     /*CAN NEVER HAPPEN*/                      00065000
```

TABLE 12-continued

| | | |
|---|---|---|
| END; | /*END SELECT ON RANK VALUES*/ | 00066000 |
| RETURN RNKRI; | | 00067000 |
| END RANKS; | | 00068000 |

We claim:

1. A method for operating a computing apparatus as this node in a multiprocessing system having at least one paired node, this node including means for receiving request messages with respect to the paired node, comprising the steps executed at this node of:
generating a first rank value;
receiving from said paired node a second rank value;
associating said first and second rank values with a data atom replicated at said this node and said paired node;
receiving a request message from said paired node, the request message including a third rank value, a fourth rank value, and a request;
the first and third rank values being indicative of a significant event time at this node and the second and fourth rank values being indicative of a significant event time at paired node; and
comparing said first and second rank values with said third and fourth rank values, respectively, and selectively processing said request based upon their correspondence.

2. A method for operating a computing apparatus as this node in a multiprocessing system having at least one paired node, comprising the steps executed at this node of:
maintaining at this node a first rank set for a given data atom for the node pair of this node and paired node;
receiving from paired node a request message, the request message including a second rank set maintained at the paired node for the given data atom;
pairwise comparing said first and second rank sets to determine the correspondence between said rank sets; and
based upon said correspondence, selectively processing said request message.

3. The method of claim 1, further comprising the step of generating said first rank value as a value which changes in a predetermined manner at least with each significant event at this node with respect to said data atom.

4. The method of claim 3, wherein said generating step generates said first rank value as a monotonically increasing value with each significant event at this node with respect to any data atom replicated at this node and some other node including said paired node, an increasing value being a value representing later time.

5. The method of claim 3, further comprising the steps of:
associating with said data atom an access control characteristic, the access control characteristic specifying the view of this node of the accessibility of data with respect to said paired node; and
changing said first rank value in said predetermined manner with each significant event, a significant event including a change to said access control characteristic from a less restrictive to a more restrictive value.

6. The method of claim 5 wherein said access control characteristic is selected from the set including exclusive, unique clean, shared clean, prior, and not accessible; and wherein said significant event includes a change in the access control characteristic in the direction from not accessible to prior to shared clean to unique clean to exclusive.

7. The method of claim 3, further comprising the steps of:
associating with said data atom a quality control characteristic, the quality control characteristic specifying the relative quality difference between a data atom available at or through said paired node and the data held at this node or available through another node related to this node, and which node of this node and paired node is responsible for being able to obtain a clean copy of the data atom on behalf of the other; and
changing said first rank value in said predetermined manner with each significant event, a significant event including a change to said quality control characteristic from a less restrictive to a more restrictive value.

8. The method of claim 7, wherein said quality control characteristic is selected from the set including better, responsible, joint, not responsible, worse, and receiving; and wherein said significant event includes a change in the quality control characteristic in the direction from better to responsible to joint to not responsible to receiving, or from worse to receiving.

9. The method of claim 1, wherein said request message is a request from paired node for this node to change its view of the quality or accessibility of said data atom at said paired node.

10. The method of claim 1, wherein said first rank value represents the rank value generated at this node at the last significant event occurring at this node with respect to said data atom and said paired node, wherein said second rank value is the ranking value received at this node from paired node in a message prior to said request message and representing the rank value generated at paired node at the last significant event having then occurred at paired node with respect to said data atom and this node, wherein said third rank value is a copy maintained at paired node of the latest first rank value received at paired node at the time said request message was generated, and wherein said fourth rank value is a copy of the latest rank value generated at paired node at the last significant event having occurred at paired node with respect to said data atom and this node at the time of generating of said request message.

11. The method of claim 10, comprising the further step of comparing said second and fourth rank values, and responsive to said fourth rank value representing a rank value generated earlier in time than said second rank value, and thus indicating that said request message has been received out of order, rejecting said request message.

12. The method of claim 10, comprising the further step of comparing said first and second rank values and said second and fourth rank values, and responsive to said second and fourth rank values being equal and said first rank value representing a rank value generated later in time than said fourth rank value, and thus indicating that paired node has not received the most recent significant message from this node, rejecting said request message.

13. The method of claim 10, comprising the further step of comparing said first and second rank values and said second and fourth rank values, and responsive to said second rank value being equal to or generated prior to said fourth rank value, and to said first rank value being equal to said third rank value, and thus indicating that significant messages have been processed in order in both this node and paired node, processing said request message.

14. The method of claim 13, wherein said processing step includes the step of setting said second rank value equal to said fourth rank value.

15. The method of claim 10, comprising the further step of comparing said first and second rank values and said second and fourth rank values, and responsive to said fourth rank value representing a rank value generated latter in time than said second rank value and to said third rank value representing a rank value generated earlier in time than said first rank value, and thus indicating that this node and paired node have sent significant messages which have passed or that one or more messages have been lost, selectively rejecting or processing said request message in accordance with a predetermined criteria.

16. The method of claim 15, wherein said predetermined criteria is a ships criteria specifying at this node which of this node or paired node processes a request message received at this node from paired node when significant messages have passed.

17. In a method for operating a computing apparatus having a plurality of nodes including this node and paired node, with each node having means for storing at least one data atom and means responsive to a request for accessing a specified data atom, and communication means interconnecting selected nodes, the computing apparatus being operated in response to a request for accessing a specified data atom and controlling the modification of copies of data atoms at a plurality of nodes; wherein the computing apparatus is operated according to the steps of (1) generating a data request specifying a required currency status having an access control value of exclusive (E), unique clean (U), shared clean (S), prior (P) or not accessible (N) and having a quality control of better (B), responsible (R), joint (J), not responsible (N), worse (W), or receiving (X) for a specific data atom at the node of the request; (2) determining if the node of the request views any other node as having for said specific data atom a currency status which is in conflict with said required access control or quality control; (3) resolving currency conflicts; and thereafter (4) granting the request for accessing the specified data atom; characterized in that an improved method for detecting and resolving synchronization incidents resulting from the use of asynchronous communications between said nodes comprises the steps of:

operating each node to increment and store, with respect to a given data atom shared with a paired node, as this node rank TNRANK a time indicative rank value with each change at said each node in currency control for the specified data atom in the direction from N to P to S to U to E and with each change in quality control for the specified data atom in the direction from R to J to N to X or from W to X;

with each request message from paired node to this node, for the specified data atom, transmitting the current TNRANK at paired node as QPNRANK and a PNRANK currently held at paired node for this node as QTNRANK for the specified data atom; and responsive to a request message received at this node from paired node, comparing the TNRANK and QTNRANK rank values and the PNRANK and QPNRANK rank values; and responsive to that comparison selectively rejecting the request message, or processing the request message including storing the QPNRANK value as the paired node rank PNRANK for the specified data atom at this node.

* * * * *